US012641465B2

(12) United States Patent
Xuan et al.

(10) Patent No.: US 12,641,465 B2
(45) Date of Patent: May 26, 2026

(54) DOWNLINK SIGNAL PROCESSING METHOD AND APPARATUS

(71) Applicant: HUAWEI TECHNOLOGIES CO., LTD., Shenzhen (CN)

(72) Inventors: Yidi Xuan, Beijing (CN); Xinqian Xie, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 18/343,811

(22) Filed: Jun. 29, 2023

(65) Prior Publication Data

US 2023/0345284 A1 Oct. 26, 2023

Related U.S. Application Data

(63) Continuation of application No. PCT/CN2020/141827, filed on Dec. 30, 2020.

(51) Int. Cl.
*H04W 24/10* (2009.01)
*H04B 17/309* (2015.01)
(52) U.S. Cl.
CPC .......... *H04W 24/10* (2013.01); *H04B 17/309* (2015.01)
(58) Field of Classification Search
CPC .... H04W 24/10; H04B 17/309; H04L 5/0016; H04L 5/0094; H04L 5/0051
See application file for complete search history.

(56) References Cited

U.S. PATENT DOCUMENTS

2014/0112287 A1* 4/2014 Chun .................... H04L 5/0023
370/329
2016/0036542 A1 2/2016 Gong et al.
(Continued)

FOREIGN PATENT DOCUMENTS

CN 103188041 A 7/2013
CN 104105120 A 10/2014
(Continued)

OTHER PUBLICATIONS

Moderator LG Electronics, "Feature lead summary for AI 8.11.2.2 Feasibility and benefits for mode 2 enhancements", #3GPP TSG RAN WG1 #103-e e-Meeting R1-2009788, Nov. 19, 2020, total 79 pages.
(Continued)

*Primary Examiner* — Ricky Q Ngo
*Assistant Examiner* — David M Kayal

(57) ABSTRACT

The technology of this application relates to a downlink signal processing method and apparatus. The method includes a terminal device receiving first indication information from a network device, and determining at least one first resource block group and at least one second resource block group based on the first indication information, where the first indication information indicates the at least one first resource block group and/or the at least one second resource block group. The method further includes performing demodulation reference signal (DMRS) port detection, where a quantity of times of DMRS port detection on each of the at least one first resource block group is greater than or equal to a first preset value, and a quantity of times of DMRS port detection on each of the at least one second resource block group is less than the first preset value.

16 Claims, 6 Drawing Sheets

(56) References Cited

U.S. PATENT DOCUMENTS

| | | | |
|---|---|---|---|
| 2021/0344462 A1* | 11/2021 | Jiao ........................ | H04L 5/0051 |
| 2022/0104182 A1* | 3/2022 | Kim ........................ | H04L 5/0051 |
| 2023/0143457 A1* | 5/2023 | Levitsky ............... | H04L 5/0096 |
| | | | 370/329 |

FOREIGN PATENT DOCUMENTS

| | | | |
|---|---|---|---|
| CN | 109802806 A | | 5/2019 |
| CN | 110622547 A | | 12/2019 |
| CN | 111756504 A | | 10/2020 |
| CN | 116235451 A | | 6/2023 |
| WO | WO 2018149096 | * | 8/2018 |

OTHER PUBLICATIONS

International Search Report and Written Opinion issued in PCT/CN2020/141827, dated Sep. 28, 2021, 10 pages.
Extended European Search Report for EP Application No. 20967644.4 dated Jan. 25, 2024, 12 pages.

* cited by examiner

Communication
apparatus 10

Transceiver
module 11

Processing
module 12

DOWNLINK SIGNAL PROCESSING METHOD AND APPARATUS

CROSS-REFERENCE TO RELATED APPLICATIONS

This application is a continuation of International Application No. PCT/CN2020/141827, filed on Dec. 30, 2020, the disclosure of which is hereby incorporated by reference in its entirety.

TECHNICAL FIELD

This application relates to the communication field, and more specifically, to a downlink signal processing method and apparatus.

BACKGROUND

Currently, in a wireless communication system, it is considered that channel coefficients for different antenna ports to a terminal device are different. To enable a receive end to obtain information transmitted at a plurality of spatial layers, different demodulation reference signals (DMRSs) are configured for the antenna ports, to estimate a state of a channel between each antenna port and the terminal device, and obtain a channel coefficient for each antenna port to the terminal. The DMRSs corresponding to the different antenna ports may be multiplexed in a time division manner, a frequency division manner, a code division manner, or the like.

Because a channel estimation capability of the terminal device has an upper limit of complexity, to be specific, a quantity of times of DMRS port detection by the terminal device is limited by hardware or chip performance, the terminal device may be incapable of detecting all DMRS ports corresponding to all scheduled bandwidths or scheduled sub-bandwidths. In this case, the terminal device randomly selects several DMRS ports for detection, and performs interference suppression based on a channel result of the detection. The several detected DMRS ports may not be DMRS ports with strong interference, or the several detected DMRS ports may include a DMRS port without interference. This degrades channel estimation performance, and affects accuracy of information received by the terminal device.

SUMMARY

This application provides a downlink signal processing method. When a downlink signal received by a terminal device is interfered, the terminal device dynamically assigns a channel estimation resource based on a state of interference on each resource block group, so that a capability of the terminal device to suppress or cancel interference is more fully utilized, and unnecessary calculation overheads are reduced.

According to a first aspect, a downlink signal processing method is provided. The method may be performed by a terminal device, or may be performed by a chip or a circuit configured in a terminal device. The following uses an example in which the method is performed by a terminal device for description. The method includes: The terminal device receives first indication information from a network device; determines at least one first resource block group and at least one second resource block group based on the first indication information, where the first indication information indicates the at least one first resource block group and/or the at least one second resource block group; and performs DMRS port detection, where a quantity of times of DMRS port detection on each of the at least one first resource block group is greater than or equal to a first preset value, and a quantity of times of DMRS port detection on each of the at least one second resource block group is less than the first preset value.

It should be understood that, for the DMRS port detection, the terminal device may determine, based on an index of a DMRS port, a time domain position and a frequency domain position that are of a DMRS corresponding to the DMRS port, receive a DMRS signal on a time-frequency resource corresponding to the time domain position and the frequency domain position, and detect the DMRS signal, to determine a channel coefficient of a channel corresponding to a signal associated with the DMRS port. Therefore, the DMRS port detection may also be understood as determining the channel coefficient corresponding to the DMRS port.

In the foregoing technical solution, the network device indicates, to the terminal device, a resource block group receiving more interference and a resource block group receiving less interference. Then, the terminal device dynamically assigns a channel estimation resource based on a state of interference on each resource block group. The terminal device increases a quantity of times of DMRS port detection on the resource block group receiving more interference, to fully utilize a capability to suppress or cancel interference. The terminal device reduces a quantity of times of DMRS port detection on the resource block group receiving less interference, to reduce unnecessary calculation overheads.

In some possible implementations, when the terminal device performs DMRS port detection, a quantity of times of channel estimation corresponding to the second resource block group may be reduced, or the quantity of times of DMRS port detection by the terminal device on the second resource block group may be reduced; or a quantity of times of channel estimation on the first resource block group is increased, or the quantity of times of DMRS port detection on the first resource block group may be increased.

It should be understood that the first indication information may indicate only the first resource block group, or indicate only the second resource block group, or indicate the first resource block group and the second resource block group. In the three cases, the terminal device can determine the first resource block group and the second resource block group based on the first indication information. Both the first resource block group and the second resource block group are included in a third resource block group, and the third resource block group is a resource block group used for carrying a downlink signal sent by the network device to the terminal device.

With reference to the first aspect, in some possible implementations, the terminal device receives second indication information from the network device, where the second indication information indicates at least one first code division multiplexing (CDM) group, the at least one first CDM group is a CDM group that corresponds to the at least one first resource block group and includes a DMRS port associated with an interference signal, and the performing DMRS port detection includes: detecting at least one DMRS port in the at least one first CDM group and at least one first DMRS port on the at least one first resource block group; detecting all DMRS ports in the at least one first CDM group and at least one first DMRS port on the at least one first resource block group; or detecting all DMRS ports in the at least one first CDM group, at least one first DMRS port, and at least one second DMRS port on the at least one first resource block group. The at least one first DMRS port is a DMRS port associated with a downlink signal to be sent by the network device to the terminal device, and the at least one second DMRS port is one or more of DMRS ports except all the DMRS ports in the first CDM group and all ports in the at least one first DMRS port in DMRS ports corresponding to the at least one first resource block group.

In some possible implementations, the first DMRS port is in the first CDM group, or the first DMRS port is not in the first CDM group.

In some possible implementations, all the detected DMRS ports in the first CDM group include the DMRS port associated with the interference signal, and may also include the first DMRS port.

In some possible implementations, for the first resource block group, based on a quantity of times of DMRS port detection that can be performed by the terminal device on the first resource block group, the terminal device may further detect one or more second DMRS ports in addition to detecting all the DMRS ports in the first CDM group and the first DMRS port.

In the foregoing technical solution, the terminal device increases the quantity of times of DMRS port detection on the resource block group receiving more interference. In addition, the terminal device preferentially detects a DMRS port in the first CDM group on the first resource block group. This reduces a problem that all DMRS ports associated with the interference signal cannot be detected because several DMRS ports are randomly selected for detection, and therefore, fully utilizes the capability to suppress interference.

With reference to the first aspect, in some possible implementations, third indication information is received from the network device, where the third indication information indicates at least one third DMRS port, the at least one third DMRS port is a DMRS port that corresponds to the at least one second resource block group and is associated with an interference signal, and the performing DMRS port detection includes: detecting at least one DMRS port in the at least one third DMRS port and the at least one first DMRS port on the at least one second resource block group; or detecting all DMRS ports in the at least one third DMRS port, the at least one first DMRS port, and at least one fourth DMRS port on the at least one second resource block group. The at least one first DMRS port is the DMRS port associated with the downlink signal to be sent by the network device to the terminal device, and the at least one fourth DMRS port is one or more of DMRS ports except the at least one third DMRS port in DMRS ports corresponding to the at least one second resource block group.

In some possible implementations, for the second resource block group, the terminal device preferentially detects, based on a quantity of times of DMRS port detection that can be performed by the terminal device on the second resource block group, the third DMRS port indicated by the network device and the first DMRS port that carries and is associated with the downlink signal to be sent by the network device to the terminal device.

In some possible implementations, for the second resource block group, based on the quantity of times of DMRS port detection that can be performed by the terminal device on the second resource block group, the terminal device may further detect the fourth DMRS port in addition to detecting the third DMRS port indicated by the network device and the first DMRS port that carries the downlink signal to be sent by the network device to the terminal device. The at least one fourth DMRS port is the one or more of DMRS ports except the at least one third DMRS port in the DMRS ports corresponding to the at least one second resource block group.

In the foregoing technical solution, the terminal device reduces the quantity of times of DMRS port detection on the resource block group receiving less interference. In addition, the terminal device preferentially detects the third DMRS port. For the resource block group receiving less interference, the foregoing solution reduces a case in which the terminal device performs channel estimation on a DMRS port without interference, and therefore, effectively reduces calculation overheads used for DMRS port detection or DMRS port channel estimation.

With reference to the first aspect, in some possible implementations, power or strength of an interference signal received by the terminal device is greater than a second preset value, or a correlation between the DMRS port associated with the interference signal and the first DMRS port is greater than a third preset value.

With reference to the first aspect, in some possible implementations, the first preset value is determined, where the first preset value is predefined, or the first preset value is indicated by the network device.

With reference to the first aspect, in some possible implementations, before the first preset value is determined, the method further includes: sending fourth indication information to the network device, where the fourth indication information indicates a maximum quantity of times of DMRS port detection by the terminal device on one or more resource blocks.

With reference to the first aspect, in some possible implementations, the determining at least one first resource block group and at least one second resource block group based on the first indication information includes: indicating the at least one first resource block group by using the first indication information, and determining a resource block group other than the at least one first resource block group in a third resource block group as the at least one second resource block group; or indicating the at least one second resource block group by using the first indication information, and determining a resource block group other than the at least one second resource block group in a third resource block group as the at least one first resource block group. The third resource block group is a resource block group that carries the downlink signal to be sent by the network device to the terminal device.

With reference to the first aspect, in some possible implementations, the first indication information indicates the at least one first resource block group and the at least one second resource block group, and the method further includes: determining a resource block group other than the at least one first resource block group and the at least one second resource block group in a third resource block group as at least one fourth resource block group.

With reference to the first aspect, in some possible implementations, the performing DMRS port detection further includes: A quantity of times of DMRS port detection on each of the at least one fourth resource block group is less than or equal to the quantity of times of DMRS port detection on each of the at least one first resource block group, and is greater than the quantity of times of DMRS port detection on each of the at least one second resource block group.

According to a second aspect, a downlink signal processing method is provided and includes: generating first indication information; and sending the first indication information to a terminal device, where the first indication information indicates at least one first resource block group and/or at least one second resource block group, and the first indication information indicates that a quantity of times of DMRS port detection by the terminal device on each first resource block group is greater than or equal to a first preset value, and a quantity of times of DMRS port detection by the terminal device on each second resource block group is less than the first preset value.

In the foregoing technical solution, a network device indicates, to the terminal device, a resource block group receiving more interference and a resource block group receiving less interference. Then, the terminal device dynamically assigns a channel estimation resource based on a state of interference on each resource block group. The terminal device increases a quantity of times of DMRS port detection on the resource block group receiving more interference, to fully utilize a capability to suppress or cancel interference. The terminal device reduces a quantity of times of DMRS port detection on the resource block group receiving less interference, to reduce unnecessary calculation overheads.

In some possible implementations, the first indication information indicates that the first resource block group is a resource block group that has a quantity of DMRS ports with strong interference greater than or equal to a fourth preset value and that is in a third resource block group, and the second resource block group may be a resource block group that has a quantity of DMRS ports with strong interference less than or equal to a fifth preset value and that is in the third resource block group. The fourth preset value is greater than an average quantity of DMRS ports that can be detected by the terminal device on each third resource block group, and the fifth preset value is less than the average quantity of DMRS ports that can be detected by the terminal device on each third resource block group.

With reference to the second aspect, in some possible implementations, second indication information is sent to the terminal device, where the second indication information indicates at least one first CDM group, and the at least one first CDM group is a CDM group that corresponds to the at least one first resource block group and includes a DMRS port associated with an interference signal.

With reference to the second aspect, in some possible implementations, third indication information is sent to the terminal device, where the third indication information indicates at least one third DMRS port, and the at least one third DMRS port corresponds to the at least one second resource block group and includes a DMRS port corresponding to an interference signal.

With reference to the first aspect, in some possible implementations, power or strength of an interference signal received by the terminal device is greater than a second preset value, or a correlation between the DMRS port associated with the interference signal and the first DMRS port is greater than a third preset value.

With reference to the second aspect, in some possible implementations, before the sending the first indication information to a terminal device, the method further includes: receiving fourth indication information from the terminal device, where the fourth indication information indicates a maximum quantity of times of DMRS port detection by the terminal device on one or more resource blocks; and determining the first preset value based on the fourth indication information.

In some possible implementations, in the third resource block group, when the network device determines that a quantity of DMRS ports with strong interference on one or more resource block groups is greater than an average quantity of DMRS ports that can be detected by the terminal device on each of the third resource block group, the network device determines the average quantity of DMRS ports that can be detected by the terminal device on each of the third resource block group as the first preset value. Subsequently, the network device may not send the first preset value to the terminal device, or may send the first preset value to the terminal device.

In some possible implementations, when the network device determines that quantities of DMRS ports with strong interference on all resource block groups in the third resource block group are less than or equal to the average quantity of DMRS ports that can be detected by the terminal device on each of the third resource block group, the network device re-determines a threshold, and determines the threshold as the first preset value. The threshold is less than the average quantity of DMRS ports that can be detected by the terminal device on each of the third resource block group, and is greater than a quantity of DMRS ports associated with a downlink signal to be sent by the network device to the terminal device.

With reference to the second aspect, in some possible implementations, after the first preset value is determined based on the fourth indication information, the method further includes: sending the first preset value to the terminal device.

According to a third aspect, a downlink signal processing apparatus is provided and includes: a transceiver module, configured to receive first indication information from a network device; and a processing module, configured to determine at least one first resource block group and at least one second resource block group based on the first indication information, where the first indication information indicates the at least one first resource block group and/or the at least one second resource block group. The processing module is further configured to perform DMRS port detection, where a quantity of times of DMRS port detection on each of the at least one first resource block group is greater than or equal to a first preset value, and a quantity of times of DMRS port detection on each of the at least one second resource block group is less than the first preset value.

In the technical solution of this embodiment, the network device indicates, to a terminal device, a first resource block group receiving more interference and a second resource block group receiving less interference. Then, the terminal device dynamically assigns a channel estimation resource based on a state of interference on each resource block group. The terminal device increases the quantity of times of DMRS port detection on the first resource block group, that is, increases a quantity of times of channel estimation on the first resource block group, so that a capability of the terminal device to suppress or cancel interference is more fully utilized. The quantity of times of DMRS port detection on the second resource block group is reduced, that is, a quantity of times of channel estimation on the second resource block group is reduced, so that unnecessary calculation overheads are reduced.

With reference to the third aspect, in some possible implementations, the transceiver module is further configured to receive second indication information from the network device, where the second indication information indicates at least one first CDM group, and the at least one first CDM group is a CDM group that corresponds to the at least one first resource block group and includes a DMRS port associated with an interference signal. The processing module is further specifically configured to: detect at least one DMRS port in the at least one first CDM group and at least one first DMRS port on the at least one first resource block group; detect all DMRS ports in the at least one first CDM group and at least one first DMRS port on the at least one first resource block group; or detect all DMRS ports in the at least one first CDM group, at least one first DMRS port, and at least one second DMRS port on the at least one first resource block group. The at least one first DMRS port is a DMRS port associated with a downlink signal to be sent by the network device to the terminal device, and the at least one second DMRS port is one or more of DMRS ports except all the DMRS ports in the first CDM group and all ports in the at least one first DMRS port in DMRS ports corresponding to the at least one first resource block group.

With reference to the third aspect, in some possible implementations, the transceiver module is further configured to receive third indication information from the network device, where the third indication information indicates at least one third DMRS port, and the at least one third DMRS port is a DMRS port that corresponds to the at least one second resource block group and is associated with an interference signal. The processing module is further specifically configured to: detect at least one DMRS port in the at least one third DMRS port and the at least one first DMRS port on the at least one second resource block group; or detect all DMRS ports in the at least one third DMRS port, the at least one first DMRS port, and at least one fourth DMRS port on the at least one second resource block group. The at least one first DMRS port is the DMRS port associated with the downlink signal to be sent by the network device to the terminal device, and the at least one fourth DMRS port is one or more of DMRS ports except the at least one third DMRS port in DMRS ports corresponding to the at least one second resource block group.

With reference to the third aspect, in some possible implementations, power or strength of an interference signal received by the terminal device is greater than a second preset value, or a correlation between the DMRS port associated with the interference signal and the first DMRS port is greater than a third preset value.

With reference to the third aspect, in some possible implementations, the processing module is further configured to: determine the first preset value, where the first preset value is predefined, or the first preset value is indicated by the network device.

With reference to the third aspect, in some possible implementations, the transceiver module is further configured to: send fourth indication information to the network device, where the fourth indication information indicates a maximum quantity of times of DMRS port detection by the terminal device on one or more resource blocks.

With reference to the third aspect, in some possible implementations, the processing module is further specifically configured to: indicate the at least one first resource block group by using the first indication information, and determine a resource block group other than the at least one first resource block group in a third resource block group as the at least one second resource block group; or indicate the at least one second resource block group by using the first indication information, and determine a resource block group other than the at least one second resource block group in a third resource block group as the at least one first resource block group. The third resource block group is a resource block group that carries the downlink signal to be sent by the network device to the terminal device.

With reference to the third aspect, in some possible implementations, the processing module is further specifically configured to: determine a resource block group other than the at least one first resource block group and the at least one second resource block group in a third resource block group as at least one fourth resource block group.

With reference to the third aspect, in some possible implementations, the processing module is further specifically used in the following cases: A quantity of times of DMRS port detection on each of the at least one fourth resource block group is less than or equal to the quantity of times of DMRS port detection on each of the at least one first resource block group, and is greater than the quantity of times of DMRS port detection on each of the at least one second resource block group.

According to a fourth aspect, a downlink signal processing apparatus is provided and includes: a processing module, configured to generate first indication information; and a transceiver module, configured to send the first indication information to a terminal device, where the first indication information indicates at least one first resource block group and/or at least one second resource block group, and the first indication information indicates that a quantity of times of DMRS port detection by the terminal device on each first resource block group is greater than or equal to a first preset value, and a quantity of times of DMRS port detection by the terminal device on each second resource block group is less than the first preset value.

With reference to the fourth aspect, in some possible implementations, the transceiver module is further configured to: send second indication information to the terminal device, where the second indication information indicates at least one first CDM group, and the at least one first CDM group is a CDM group that corresponds to the at least one first resource block group and includes a DMRS port associated with an interference signal.

With reference to the fourth aspect, in some possible implementations, the transceiver module is further configured to: send third indication information to the terminal device, where the third indication information indicates at least one third DMRS port, and the at least one third DMRS port is a DMRS port that corresponds to the at least one second resource block group and is associated with an interference signal.

With reference to the fourth aspect, in some possible implementations, the transceiver module is further configured to receive fourth indication information from the terminal device, where the fourth indication information indicates a maximum quantity of times of DMRS port detection by the terminal device on one or more resource blocks. The processing module is further configured to determine the first preset value based on the fourth indication information.

With reference to the fourth aspect, in some possible implementations, the transceiver module is further configured to: send the first preset value to the terminal device.

According to a fifth aspect, a communication apparatus is provided and includes: a processor and a memory. The memory is configured to store a computer program. The processor is configured to execute the computer program stored in the memory, to enable the communication apparatus to perform the communication methods described herein.

According to a sixth aspect, a computer-readable storage medium is provided. The computer-readable storage medium stores a computer program. When the computer program runs on a computer, the computer is enabled to perform the communication methods described herein.

According to a seventh aspect, a chip system is provided and includes: a processor, configured to invoke a computer program from a memory and run the computer program, to enable a communication device on which the chip system is installed to perform the communication methods described herein.

According to an eighth aspect, a communication system is provided. The communication system includes at least one terminal device described above and at least one network device described above, and is configured to perform the communication method according to the first aspect or the second aspect.

According to the solutions in embodiments of this application, the network device indicates, to the terminal device, the resource block group receiving more interference and the resource block group receiving less interference. Then, the terminal device dynamically assigns a channel estimation resource based on a state of interference on each resource block group. The terminal device increases the quantity of times of DMRS port detection on the resource block group receiving more interference, to fully utilize the capability to suppress or cancel interference. The terminal device reduces the quantity of times of DMRS port detection on the resource block group receiving less interference, to reduce the unnecessary calculation overheads.

DESCRIPTION OF EMBODIMENTS

Figure 1:
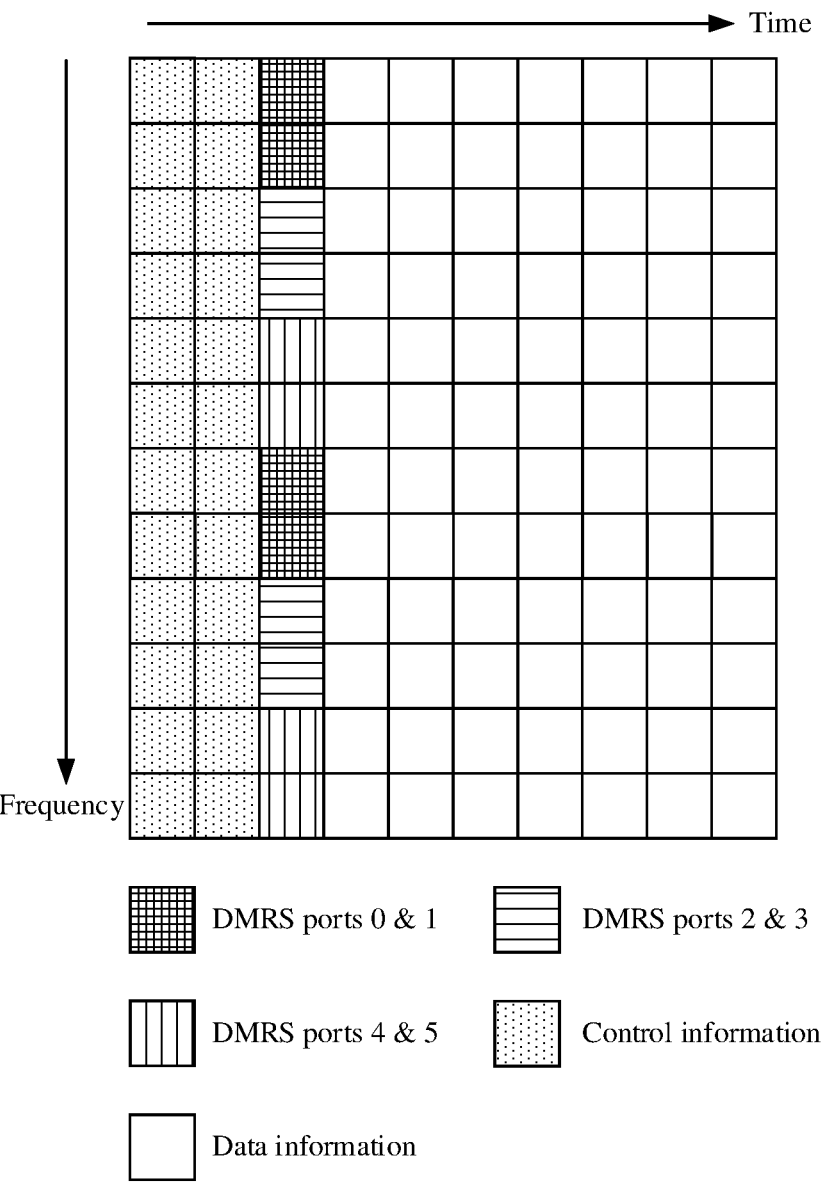
FIG. 1 is a schematic diagram of an example of a DMRS pattern in a 5G system.

The following describes technical solutions of this application with reference to accompanying drawings.

Terms such as "component", "module", and "system" used in this specification are used for indicating computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that run on the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

(1) A terminal is also referred to as user equipment (UE), a mobile station (MS), a mobile terminal (MT), or the like, and is a device that provides voice/data connectivity for a user, for example, a handheld device or a vehicle-mounted device with a wireless connection function. Currently, some terminals are described as the following examples: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

(2) A network device is a device in a wireless network, for example, a radio access network (RAN) node that connects a terminal to the wireless network. Currently, some RAN nodes are described as the following examples: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or the like. In a network structure, the network device may include a central unit (CU) node, or a distributed unit (DU) node, or a RAN device including a CU node and a DU node.

The technical solutions in embodiments of this application are applicable to various communication systems, for example, a global system for mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5G system, a new radio (NR) system, or the like.

Before embodiments of this application are described, several concepts related to embodiments of this application are first briefly described.

In a 5G new radio (NR) system and a long term evolution (LTE) system, an orthogonal frequency division multiple access (OFDMA) manner is usually used as a multiple access manner. A main characteristic of the orthogonal frequency division multiple access manner is that a transmission resource is divided to obtain mutually orthogonal time-frequency resource elements (REs), and signals sent by a transmit end are all carried on the REs and transmitted to a receive end. Because different REs are orthogonal to each other, the receive end may separately receive a signal sent on each RE. In consideration of a fading characteristic of a wireless channel, the signal carried on the RE is distorted after being transmitted on a channel, and channel distortion is usually referred to as a channel coefficient. To recover a received signal, the receive end needs to estimate the channel coefficient. A process of obtaining channel information by the receive end may also be referred to as channel estimation. In a conventional technology, a solution of performing channel estimation based on a reference signal is usually used. To be specific, the transmit end transmits a known signal on a specific RE, and the receive end estimates the channel coefficient based on the received signal and the known signal, and performs interpolation on a channel coefficient of another RE based on the channel coefficient obtained through estimation, to receive and demodulate a data signal.

In an existing wireless communication system, a base station end may be equipped with a plurality of antennas to implement spatial multiplexing transmission by using a multi-input multi-output (MIMO) technology. In other words, a plurality of data streams are transmitted on a same time-frequency resource, each data stream is transmitted at an independent spatial layer, and each spatial layer is mapped to a different antenna port for transmission. It is considered that channel coefficients for different antenna ports to a terminal device are different. To obtain information transmitted at a plurality of spatial layers, the receive end needs to estimate a channel coefficient for each antenna port to the terminal. Therefore, different DMRSs need to be configured for the antenna ports respectively. The DMRSs corresponding to the different antenna ports may be multiplexed in a time division manner, a frequency division manner, a code division manner, or the like. For example, as shown in FIG. 1, a total quantity of DMRS ports is 6, and a quantity of CDM groups is 3. A horizontal direction represents time domain, a vertical direction represents frequency domain, and each small block represents one RE. DMRS ports 0 and 1 are multiplexed by using orthogonal codes. Therefore, REs corresponding to the two ports are also referred to as a code division multiplexing (CDM) group.

1. Subcarrier: In a communication system using an orthogonal frequency division multiplexing (OFDM) technology, a frequency domain resource is divided into several sub-resources, and each sub-resource in frequency domain may be referred to as a subcarrier. The subcarrier may also be understood as a minimum granularity of the frequency domain resource. The OFDM technology is a multi-carrier modulation technology.

2. Subcarrier spacing: The subcarrier spacing is an interval value between center locations or peak locations of two adjacent subcarriers in frequency domain in a communication system using an OFDM technology. For example, a subcarrier spacing in an LTE system is 15 kHz, and a subcarrier spacing in a 5G NR system may be 15 kHz, 30 kHz, 60 kHz, 120 kHz, or the like.

3. Resource block: N consecutive subcarriers in frequency domain may be referred to as one resource block. For example, one resource block in an LTE system includes 12 subcarriers, and one resource block in a 5G NR system also includes 12 subcarriers. With evolution of a communication system, one resource block may alternatively include another quantity of subcarriers.

4. Slot: One slot in a 5G NR system includes 14 OFDM symbols, a length of a slot corresponding to a 15 kHz subcarrier spacing is 1 ms, and a length of a slot corresponding to a 30 kHz subcarrier spacing is 0.5 ms.

5. Subframe: A time length of one subframe in a 5G NR system is 1 ms.

6. OFDM symbol: The OFDM symbol is a minimum time unit in time domain in an OFDM system.

7. Time-frequency resource element: The time-frequency resource element is a minimum time-frequency resource granularity in an OFDM system, is one OFDM symbol in time domain, and is one subcarrier in frequency domain.

8. Sub-band: One sub-band includes one or more resource blocks in frequency domain, or one sub-band may include one or more resource block groups in frequency domain. Because each resource block group also includes a plurality of resource blocks, a size of one sub-band may be the same as or different from a size of one resource block group. When the size of the sub-band is the same as the size of the resource block group, the sub-band may also be understood as the resource block group.

9. Antenna port: In a 5G NR system, the antenna port is a logical port used for transmission, and one antenna port includes a plurality of physical antennas. From a perspective of a receive end, each antenna port corresponds to an independent wireless channel.

10. DMRS: A demodulation reference signal is a reference signal used for recovering a received signal. The DMRS is a signal known to both a transmit end and a receive end. The transmit end transmits the DMRS and data to the receive end through a same port and a same wireless channel. The receive end obtains a channel coefficient based on the DMRS in the received signal, and demodulates and decodes the received signal based on the channel coefficient, to obtain sent data. In a 5G NR system, it is considered that channel coefficients for different antenna ports to a terminal are different. To obtain information transmitted at a plurality of spatial layers, a receive end needs to estimate a channel coefficient for each antenna port to the terminal. Therefore, different DMRSs need to be configured for the antenna ports respectively. The DMRSs corresponding to the different antenna ports may be multiplexed in a time division manner, a frequency division manner, a code division manner, or the like. Currently, the 5G NR system can support a maximum of 12 DMRS ports.

11. Spatial layer: In an existing wireless communication system, a base station end is equipped with a plurality of antennas to implement spatial multiplexing transmission by using a MIMO technology. In other words, a plurality of different data streams are transmitted on a same time-frequency resource, each irrelevant data stream is transmitted at an independent spatial layer, and each spatial layer is mapped to a different antenna port for transmission.

12. DMRS port detection: A terminal device may determine, based on an index of a DMRS port, a time domain position and a frequency domain position of a DMRS corresponding to the DMRS port in one or more slots, receive a DMRS signal on a time-frequency resource corresponding to the time domain position and the frequency domain position, and detect the DMRS signal, to determine a channel coefficient of a channel corresponding to a signal associated with the DMRS port. Therefore, the DMRS port detection may also be referred to as determining the channel coefficient corresponding to the DMRS port.

13. Interference signal: In a communication system, for a terminal device, in a received downlink signal, in addition to a signal sent by a network device to the terminal device, there may be another signal that is not expected to be received by the terminal device. For example, when a first terminal device communicates with a first network device, and the first terminal device receives, on one time-frequency resource, a downlink signal sent by the first network device, an uplink signal sent by a second terminal device or a downlink signal sent by a second network device may exist on the same time-frequency resource. When the first terminal device needs to receive the downlink signal from the first network device, the uplink signal from the second terminal device or the downlink signal from the second network device is a signal that is not expected to be received by the first terminal device, and may also be understood as an interference signal.

14. Interference suppression: When receiving a downlink signal, a terminal device processes the received downlink signal by using a channel coefficient corresponding to an interference signal, to implement a process of reducing and canceling impact of the interference signal.

15. DMRS port with strong interference: The DMRS port with strong interference is a DMRS port associated with a strong interference signal, and the strong interference signal is an interference signal that is received by a terminal device and whose power or strength is greater than a second preset value. Alternatively, a correlation between the DMRS port with strong interference and a first DMRS port is greater than a third preset value, and the first DMRS port is a DMRS port associated with a downlink signal to be sent by a network device to the terminal device.

Figures 2A, 2B:
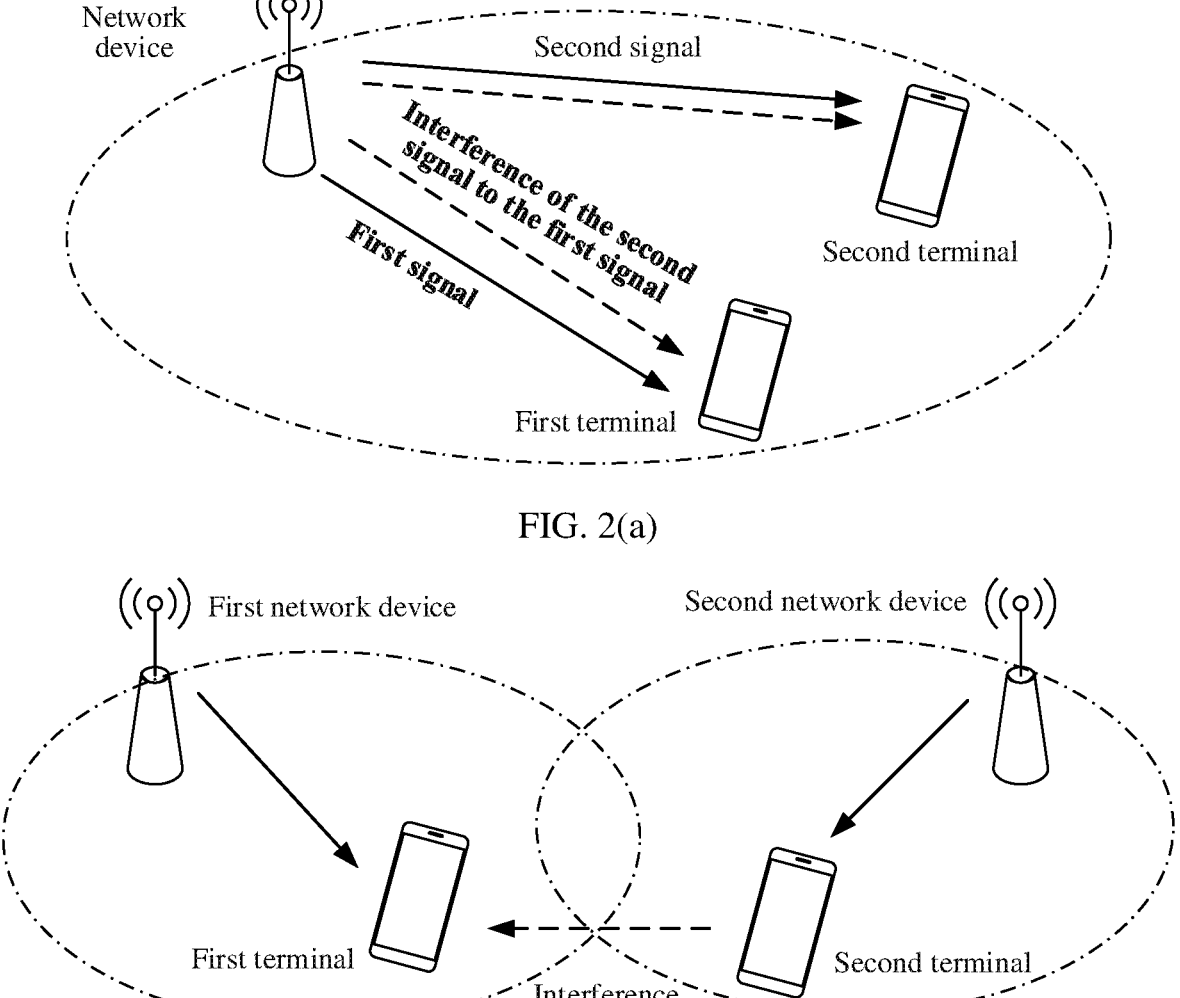
FIG. 2(*a*), FIG. 2(*b*), and FIG. 2(*c*) are example schematic diagrams of a scenario in which a terminal device receives an interference signal.

The following uses FIG. 2($a$), FIG. 2($b$), and FIG. 2($c$) as examples to describe a scenario in which a terminal device is affected by an interference signal in this application.

Scenario 1: As shown in FIG. 2($a$), a network device sends two different signals to two terminal devices on a same time-frequency resource. For example, the network device sends a first signal to a first terminal, and the network device sends a second signal to a second terminal. Because the two terminal devices receive signals on the same time-frequency resource, for the first terminal device, the first terminal device also receives the second signal when receiving the required first signal. In this case, the second signal causes interference to the first signal received by the first terminal. Therefore, the second signal is an interference signal for the first terminal device. Similarly, for the second terminal that needs to receive the second signal, the second terminal also receives the first signal when receiving the second signal. In this case, the first signal is an interference signal for the second terminal device.

Scenario 2: As shown in FIG. 2($b$), a first network device sends a downlink signal to a first terminal device, and a second network device in another neighboring cell receives an uplink signal sent by a second terminal device. Consequently, the first terminal device also receives, when receiving the downlink signal, the uplink signal sent by the second terminal. In this case, the uplink signal from the second terminal device is an interference signal for the first terminal.

Scenario 3: As shown in FIG. 2($c$), a network device is a full-duplex network device. To be specific, the network device may simultaneously send and receive a signal on a same frequency domain resource. When the network device sends a downlink signal to a first terminal, if a second terminal is sending an uplink signal to the network device, the first terminal receives, when receiving the downlink signal, the uplink signal sent by the second terminal. The uplink signal is considered as an interference signal for the first terminal.

Currently, when performing downlink communication with a network device, a terminal device may determine, based on a quantity of CDM groups that do not carry data (number of CDM groups without data) and that is included in an antenna port (antenna port(s)) field in downlink control information (DCI) sent by the network device, whether a DMRS port other than a DMRS port currently used by the terminal device is occupied by another terminal device.

There is an upper limit of complexity for a channel estimation capability of the terminal device. To be specific, a quantity of times of DMRS port detection by the terminal device (or a quantity of times of channel estimation by the terminal device on a DMRS port) is limited by hardware or a chip. If the terminal determines that there is an occupied DMRS port in remaining DMRS ports, especially when the terminal device performs spatial multiplexing in a unit of a sub-band, the terminal device may be incapable to detect all DMRS ports on all sub-bands. In this case, the terminal may randomly select several DMRS ports to perform channel estimation, determine channel coefficients of these DMRS ports, and then perform interference suppression.

For example, it is assumed that the terminal device can detect only four DMRS ports on each sub-band. However, it is specified in a 5G NR system that a maximum of 12 DMRS ports can be used. In this case, the terminal device cannot blindly detect DMRS ports on all sub-bands, but can randomly select only four DMRS ports for channel estimation.

It can be learned that, when the terminal device randomly selects the several DMRS ports for channel estimation, power of an interference signal corresponding to the selected DMRS port may be small, and a DMRS port associated with an interference signal whose power is greater than a preset value is not detected. As a result, a capability of the terminal device to suppress or cancel interference cannot be fully utilized. Particularly, in a sub-band transmission scenario, the terminal device may perform channel estimation on a DMRS port without interference in each sub-band. This causes unnecessary calculation overheads. For a sub-band with more interference, several DMRS ports randomly selected are not enough for detection of all DMRS ports associated with an interference signal, and therefore, interference cannot be completely suppressed.

Figures 2C, 3:
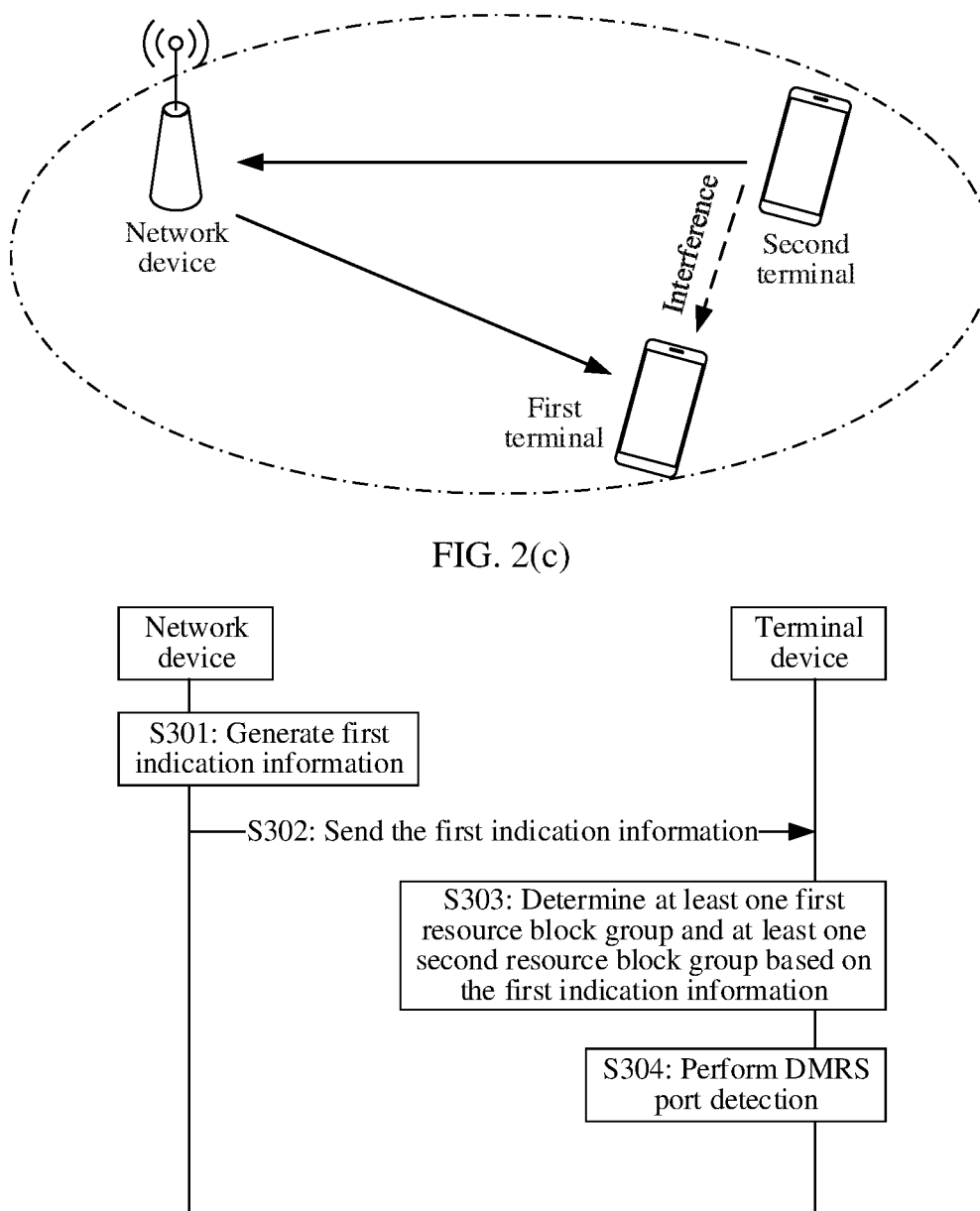
FIG. 3 is a schematic interaction diagram of an example of a downlink signal processing method according to this application.

With reference to FIG. 3, the following describes in detail a downlink signal processing method 300 according to an embodiment of this application. FIG. 3 is a schematic interaction diagram of the method 300 according to this application.

S301: A network device generates first indication information.

S302: The network device sends the first indication information to a terminal device, and correspondingly, the terminal device receives the first indication information from the network device.

Specifically, the first indication information indicates at least one first resource block group and/or at least one second resource block group.

The first indication information may indicate the first resource block group and/or the second resource block group in the following three manners.

Manner 1: The first indication information indicates the at least one first resource block group and/or the at least one second resource block group. Optionally, the first indication information may include one field, and the field indicates the at least one first resource block group and/or the at least one second resource block group by indicating an index of a resource block. A length N of the field is determined by K states of a combination of the first resource block group and the second resource block group, and one of the K states may be indicated. For example, when a quantity of resource block groups included in a scheduled bandwidth is four, the resource block groups are numbered from 0 to 3. When the first indication information indicates one first resource block group and one second resource block group, the combination of the first resource block group and the second resource block group has K=(1,4)·(1,3) states in total, and (P,Q) represents a combination quantity of P selected from Q, in other words, P first or second resource block groups are selected from Q resource block groups. In this case, a length of a field corresponding to second indication information is N=⌈log₂(1,4)·(1,3)⌉=4 bits.

Manner 2: The first indication information indicates the at least one first resource block group and/or the at least one second resource block group. The first indication information may include a first field and/or a second field, the first field indicates the at least one first resource block group, and the second field indicates the at least one second resource block group. Specifically, the first indication information indicates the at least one first resource block group, and the first indication information includes the first field. Alternatively, the first indication information indicates the at least one second resource block group, and the first indication information includes the second field. Alternatively, the first indication information indicates the at least one first resource block group and the at least one second resource block group, and the first indication information includes the first field and the second field. Optionally, the first field and/or the second field respectively indicate/indicates the at least one first resource block group and/or the at least one second resource block group by using a bitmap. A bit length of the bitmap is N. It may also be understood that the bitmap includes N bits, each bit corresponds to one resource block group, and different values of each bit indicate different states of the resource block group. A value of N is the quantity of resource block groups in the scheduled bandwidth. For example, if a bit in the bitmap is set to 1, it indicates that a resource block group corresponding to the bit is the first resource block group. On the contrary, if a bit in the bitmap is set to 0, it indicates that a resource block group corresponding to the bit is not the first resource block group. Alternatively, if a bit in the bitmap is set to 1, it indicates that a resource block group corresponding to the bit is the second resource block group. On the contrary, if a bit in the bitmap is set to 0, it indicates that a resource block group corresponding to the bit is the second resource block group.

Manner 3: The first indication information indicates the at least one first resource block group and/or the at least one second resource block group, the first indication information may include a first field and/or a second field, the first field indicates the at least one first resource block group, and the second field indicates the at least one second resource block group. Specifically, the first indication information indicates the at least one first resource block group, and the first indication information includes the first field. Alternatively, the first indication information indicates the at least one second resource block group, and the first indication information includes the second field. Alternatively, the first indication information indicates the at least one first resource block group and the at least one second resource block group, and the first indication information includes the first field and the second field. Optionally, the first field and the second field respectively indicate the at least one first resource block group and the at least one second resource block group by using indexes. A length N1 of the first field is determined by K1 states of the first resource block group, a length N2 of the second field is determined by K2 states of the second resource block group, and a length N of the first field and the second field is determined by K states of a combination of the first resource block group and the second resource block group, and one of the K states may be indicated. A manner of determining K1, K2, and K states is similar to that in Manner 1.

It should be understood that the first indication information may indicate only the first resource block group, or indicate only the second resource block group, or indicate the first resource block group and the second resource block group. In the three cases, the terminal device can determine the first resource block group and the second resource block group based on the first indication information. Both the first resource block group and the second resource block group are included in a third resource block group, and the third resource block group is a resource block group used for carrying a downlink signal sent by the network device to the terminal device.

The following describes how the network device determines the first resource block group and the second resource block group. The first resource block group may be a resource block group, in the third resource block group, whose quantity of DMRS ports with strong interference is greater than or equal to a fourth preset value. The second resource block group may be a resource block group, in the third resource block group, whose quantity of DMRS ports with strong interference is less than or equal to a fifth preset value.

Figures 4, 5:
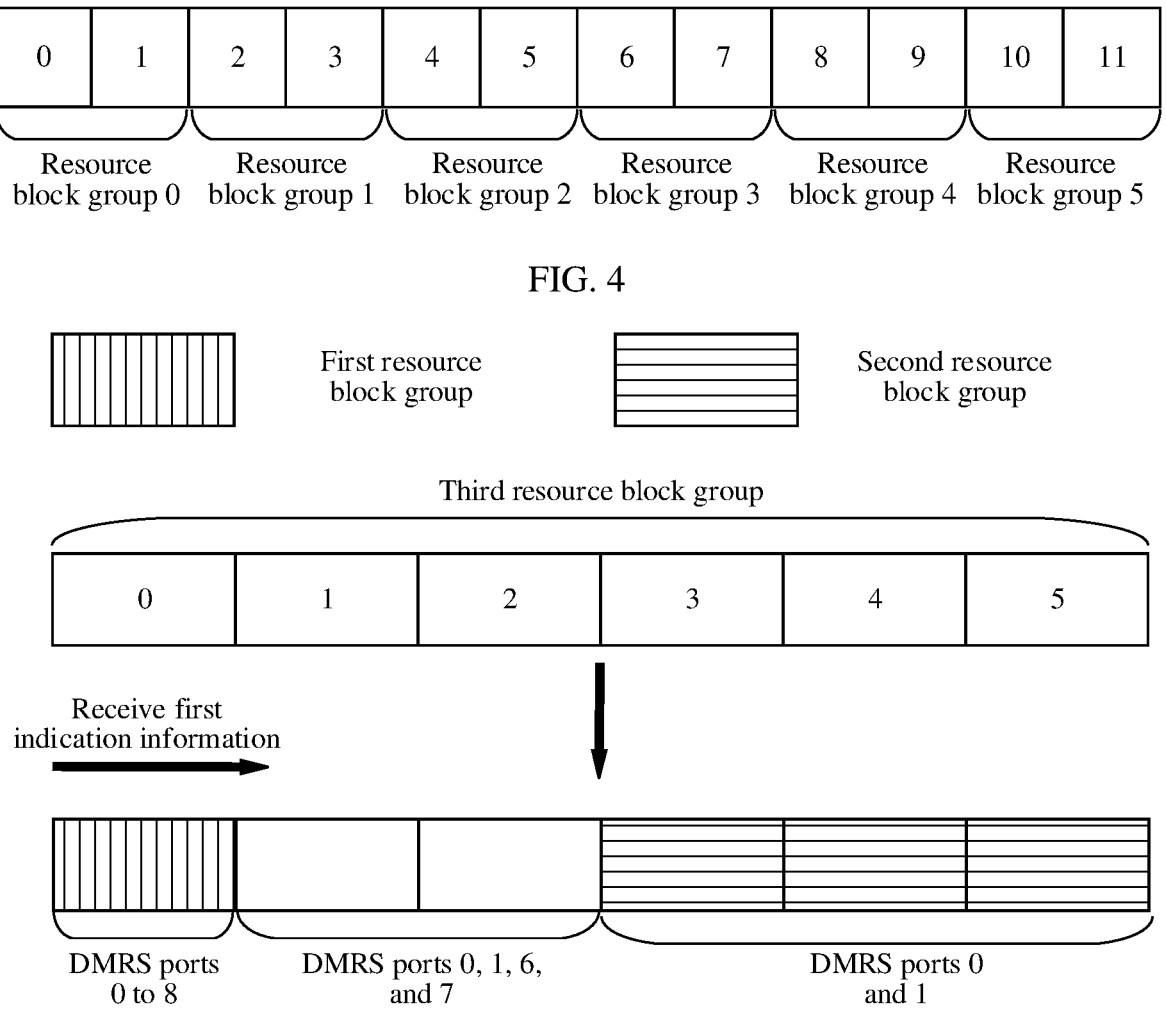
FIG. 4 is an example schematic block diagram of a resource block group for carrying a downlink signal according to this application.
FIG. 5 is a schematic block diagram of an example in which a terminal device dynamically assigns a channel estimation resource according to this application.

In an example, as shown in FIG. 4, for each resource block group, when a quantity of DMRS ports with strong interference that correspond to the resource block group is greater than or equal to the fourth preset value, the resource block group is the first resource block group. When the quantity of DMRS ports with strong interference that correspond to the resource block group is less than or equal to the fifth preset value, the resource block group is the second resource block group. The fourth preset value is greater than or equal to an average quantity of DMRS ports that can be detected by the terminal device on each third resource block group, and the fifth preset value is less than or equal to the average quantity of DMRS ports that can be detected by the terminal device on each third resource block group. When a quantity of DMRS ports with strong interference on a resource block group is greater than or equal to the fourth preset value, it indicates that a quantity of DMRS ports that correspond to the resource block group and that are configured for a strong interference signal received by the resource block group is large, or it indicates that the resource block group is a resource block group receiving more strong interference, which is referred to as the first resource block group in this embodiment. Therefore, the terminal device needs to increase a quantity of times of channel estimation on the first resource block group. In other words, the first resource block group is a resource block group on which the network device indicates the terminal device to increase the quantity of times of channel estimation. When a quantity of DMRS ports with strong interference on a resource block group is less than or equal to the fifth preset value, it indicates that a quantity of DMRS ports that correspond to the resource block group and that are configured for a strong interference signal received by the resource block group is small, or it indicates that the resource block group is a resource block group receiving less strong interference, which is referred to as the second resource block group in this embodiment. Therefore, the terminal device needs to reduce a quantity of times of channel estimation on the second resource block group. In other words, the second resource block group is a resource block group on which the network device indicates the terminal device to reduce the quantity of times of channel estimation.

In an example, the first indication information may be carried in first downlink control information (DCI).

In an example, the network device may further send, to the terminal device, indication information indicating the third resource block group. The indication information indicating the third resource block group may be carried in the first DCI. In an example, the network device may indicate, to the terminal device by using a frequency domain resource assignment field and a physical resource block (PRB) bundling size indicator (PRB bundling size indicator) field in the first DCI, a resource block group carrying a to-be-sent downlink signal. Specifically, a frequency domain resource assignment field in DCI sent by the network device to the terminal device indicates a frequency domain resource used for carrying a downlink signal, and the frequency domain resource includes one or more resource blocks RBs. As shown in FIG. 4, the frequency domain resource includes 12 RBs numbered from 0 to 11. Further, the network device indicates a size of each of the third resource block group by using a PRB bundling size field in the DCI. As shown in FIG. 4, the network device indicates that each of the third resource block group includes two RBs. Six resource block groups are numbered from resource block groups 0 to 5.

In an example, the network device may further send, to the terminal device, indication information indicating a first DMRS port. The indication information indicating the first DMRS port may be carried in the first DCI. The first DMRS port is a DMRS port associated with a downlink signal to be sent by the network device to the terminal device.

In an example, the network device may further send, to the terminal device, indication information indicating a first time period. The indication information indicating the first time period may be carried in the first DCI. The first time period is a time period in which the terminal device receives the downlink signal. The first time period may be determined by using a time domain resource assignment field in the first DCI.

In an example, the first DCI may further indicate the terminal device to receive, in the first time period, a downlink signal carried on the third resource block group. After receiving the first DCI, the terminal device receives, in the first time period, the downlink signal carried on the third resource block group, and processes the downlink signal. The processing may include performing DMRS port detection on the third resource block group.

S303: The terminal device determines the at least one first resource block group and the at least one second resource block group based on the first indication information.

Manner 1: The first indication information indicates the at least one first resource block group, and the terminal device determines a resource block group other than the at least one first resource block group in the third resource block group as the at least one second resource block group.

Manner 2: The first indication information indicates the at least one second resource block group, and a resource block group other than the at least one second resource block group in the third resource block group is determined as the at least one first resource block group.

Manner 3: The first indication information indicates the at least one first resource block group and the at least one second resource block group. The terminal device determines a resource block group other than the at least one first resource block group and the at least one second resource block group in the third resource block group as at least one fourth resource block group.

In an example, the terminal device receives the DCI from the network device, and determines, based on the frequency domain resource assignment field, a frequency domain resource carrying the downlink signal to be sent by the network device to the terminal device. The frequency domain resource includes one or more RBs. Then, the terminal device determines the third resource block group based on the frequency domain resource and the PRB bundling size indicator field. Specifically, as shown in FIG. 4, the terminal device may determine that the frequency domain resource carrying the to-be-sent downlink signal includes 12 RBs. Further, the frequency domain resource may be divided into six resource block groups, and each third resource block group includes two RBs.

After receiving the first indication information, the terminal device determines all first resource block groups and all second resource block groups in the third resource block group based on the first indication information. Specifically, the determining may be performed based on the foregoing three manners.

S304: The terminal device performs DMRS port detection.

A quantity of times of DMRS port detection on each of the at least one first resource block group is greater than or equal to a first preset value, and a quantity of times of DMRS port detection on each of the at least one second resource block group is less than the first preset value.

In other words, a quantity of times of channel estimation by the terminal device on the first resource block group is greater than or equal to the first preset value, and a quantity of times of channel estimation by the terminal device on the second resource block group is less than the first preset value. After receiving the first indication information, the terminal device dynamically assigns a channel estimation resource. The channel estimation resource herein may be understood as a computing resource used for channel estimation. The dynamic assignment herein is specifically reducing the quantity of times of channel estimation corresponding to the second resource block group, or may be reducing the quantity of times of DMRS port detection by the terminal device on the second resource block group. Alternatively, the dynamic assignment herein is specifically increasing the quantity of times of channel estimation on the first resource block group, or increasing the quantity of times of DMRS port detection on the first resource block group.

FIG. 5 is a schematic block diagram in which a terminal device dynamically assigns a channel estimation resource according to this application.

As shown in FIG. 5, in an example, a network device schedules a third resource block group for the terminal device to transmit a downlink signal. The third resource block group includes six resource block groups numbered from resource block groups 0 to 5. It is assumed that the terminal device may perform channel estimation on four DMRS ports on each resource block group, and the terminal device performs channel estimation on DMRS ports 0, 1, 6, and 7 on each resource block group. The terminal device receives first indication information, determines, based on the first indication information, that the resource block group 0 is a first resource block group, and determines that the resource block groups 3 and 5 are second resource block groups. In this case, the terminal device increases a quantity of detected DMRS ports on the first resource block group (which is the resource block group 0) and reduces a quantity of detected DMRS ports on each second resource block group (which is the resource block group 3, 4, or 5). For example, the terminal device may detect DMRS ports 0 to 8 on the resource block group 0, and the terminal device may detect only DMRS ports 0 and 1 on the resource block group 3, 4, or 5. It can be learned from the foregoing descriptions that the quantity of times of DMRS port detection by the terminal device on the first resource block group is greater than the quantity of times of DMRS port detection by the terminal device on the second resource block group. In other words, the quantity of times of channel estimation by the terminal device on the first resource block group is greater than the quantity of times of channel estimation by the terminal device on the second resource block group.

According to the solution in this embodiment of this application, the network device indicates, to the terminal device, a first resource block group receiving more interference and a second resource block group receiving less interference. Then, the terminal device dynamically assigns the channel estimation resource based on a state of interference on each resource block group. The terminal device increases the quantity of times of DMRS port detection on the first resource block group, that is, increases the quantity of times of channel estimation on the first resource block group, so that a capability of the terminal device to suppress or cancel interference is more fully utilized. The quantity of times of DMRS port detection on the second resource block group is reduced, that is, the quantity of times of channel estimation on the second resource block group is reduced, so that unnecessary calculation overheads are reduced.

Optionally, the method 300 further includes:

The network device sends second indication information to the terminal device, and correspondingly, the terminal device receives the second indication information.

The second indication information indicates at least one first CDM group, the at least one first CDM group corresponds to the at least one first resource block group, and the at least one first CDM group includes a DMRS port associated with an interference signal.

Optionally, the second indication information may indicate the first CDM group by using an index. In an example, if each of the first resource block group includes a total of three CDM groups numbered from 0 to 2, and the second indication information sent by the network device indicates one first CDM group, there are K=(1,3) states in total. Therefore, the second indication information may indicate one of the K states.

Optionally, in one of the at least one first resource block group, provided that there is one CDM group that includes a DMRS port corresponding to an interference signal and that is on one of the resource blocks, the network device indicates, in the second indication information, that the CDM group on each of all first resource block groups is the first CDM group. For example, the third resource block group is divided into resource block groups 0 to 5, and each resource block group includes two RBs. Each resource block includes 12 DMRS ports numbered from DMRS ports 0 to 11. The 12 DMRS ports are divided into three CDM groups numbered from CDM groups 0 to 2. It is assumed that the first indication information indicates that resource block groups 0 and 3 are first resource block groups. In addition, the terminal device learns that CDM groups 0 and 1 are first CDM groups on the resource block group 0, and CDM groups 1 and 2 are first CDM groups on the resource block group 3. In this case, when indicating a first CDM group corresponding to the first resource block group, the second indication information specifically indicates that first CDM groups on the resource block groups 0 and 3 are CDM groups 1, 2, and 3.

In an example, power or strength of an interference signal received by the terminal device is greater than a second preset value, or a correlation between the DMRS port associated with the interference signal and the first DMRS port is greater than a third preset value. In this embodiment, an interference signal that meets the foregoing condition is also referred to as a strong interference signal, and a DMRS port associated with the interference signal that meets the foregoing condition is referred to as a DMRS port with strong interference.

In an example, the second indication information may be carried in DCI. Further, the second indication information and the first indication information may be carried in the same DCI. In other words, the second indication information and the first indication information may be carried in the first DCI.

Therefore, when the terminal device performs DMRS port detection, the following solutions may be further included.

That the terminal device performs DMRS port detection on the at least one first resource block group based on the second indication information includes the following three possible cases:

Possible case 1: At least one DMRS port in the at least one first CDM group and at least one first DMRS port are detected.

For the first resource block group, the terminal device preferentially detects, based on a quantity of times of DMRS port detection that can be performed by the terminal device on the first resource block group, one or more DMRS ports associated with the interference signal in the first CDM group and the at least one first DMRS port that carries and is associated with the downlink signal sent by the network device to the terminal device.

It should be understood that the first DMRS port may be in the first CDM group, or may not be in the first CDM group.

Possible case 2: All DMRS ports in the at least one first CDM group and at least one first DMRS port are detected.

For the first resource block group, the terminal device preferentially detects all the DMRS ports in the first CDM group and the first DMRS port based on a quantity of times of DMRS port detection that can be performed by the terminal device on the first resource block group.

It should be understood that, all the detected DMRS ports in the first CDM group include the DMRS port associated with the interference signal, and may also include the first DMRS port.

Possible case 3: All DMRS ports in the at least one first CDM group, at least one first DMRS port, and at least one second DMRS port are detected.

For the first resource block group, based on the quantity of times of DMRS port detection that can be performed by the terminal device on the first resource block group, the terminal device may further detect one or more second DMRS ports in addition to detecting all the DMRS ports in the first CDM group and the first DMRS port.

It should be noted that, the at least one first DMRS port is the DMRS port associated with the downlink signal to be sent by the network device to the terminal device, and the at least one second DMRS port is one or more of DMRS ports except all the DMRS ports in the first CDM group and all ports in the at least one first DMRS port in DMRS ports corresponding to the at least one first resource block group.

Optionally, the interference signal is the foregoing strong interference signal. In other words, the power or strength of an interference signal received by the terminal device is greater than the second preset value, or the correlation between the DMRS port associated with the interference signal and the first DMRS port is greater than the third preset value.

Further, the terminal device may process, based on a channel coefficient of a DMRS port that carries the interference signal and that is detected on the first resource block group and a channel coefficient of a first DMRS port associated with the downlink signal that is sent by the network device to the terminal device and is carried on the first resource block group, the downlink signal received by the terminal device on the first resource block group. For example, the processing is interference suppression, demodulation or the like.

According to the solution of this embodiment of this application, based on that the quantity of times of DMRS port detection by the terminal device on the first resource block group is greater than or equal to the first preset value, the network device further indicates, for the first resource block group, the first CDM group including the DMRS port associated with the interference signal, and the terminal device preferentially detects the DMRS port in the first CDM group on the first resource block group. For a resource block group receiving more interference, a problem that all DMRS ports associated with the interference signal cannot be detected because several DMRS ports are randomly selected for detection is reduced, so that the capability of the terminal device to suppress interference is more fully utilized. In addition, because there are a large quantity of DMRS ports associated with the interference signal in the first resource block, in comparison with further exhausting all the DMRS ports associated with the interference signal on the first resource block, this solution effectively reduces signaling overheads.

Optionally, the method 300 further includes:

The network device sends third indication information to the terminal device, where the third indication information indicates at least one third DMRS port, and the at least one third DMRS port is a DMRS port that corresponds to the at least one second resource block group and is associated with an interference signal.

The third indication information may indicate the at least one first DMRS port by using an index. For example, if the terminal device includes a total of 12 DMRS ports numbered from 0 to 11, and the third indication information sent by the network device indicates one third DMRS port, there are $K=(1,12)$ states in total. Therefore, the third indication information may indicate one of the K states.

In an example, each of the first resource block group includes 12 DMRS ports numbered from DMRS ports 0 to 11. The 12 DMRS ports are divided into three CDM groups numbered from CDM groups 0 to 2. The CDM group 0 includes DMRS ports 0, 1, 6, and 7, the CDM group 1 includes DMRS ports 2, 3, 8, and 9, and the CDM group 2 includes DMRS ports 4, 5, 10, and 11. The DMRS port associated with the downlink signal sent by the network device to the terminal device is the DMRS port 0, and DMRS ports with strong interference are DMRS ports 1, 2, and 6. Because the CDM group 0 includes the DMRS ports 1 and 6 with strong interference, and the CDM group 1 includes the DMRS port 2 with strong interference, the network device indicates the CDM groups 0 and 1 to the terminal device in the second indication information.

It should be noted that, the "at least one third DMRS port" may be all or a part of DMRS ports in all DMRS ports corresponding to the second resource block group and the interference signal.

In addition, the third indication information indicates, for all second resource block groups, at least one third DMRS port corresponding to all the second resource block group, or may indicate, for each second resource block group, at least one third DMRS port corresponding to each second resource block group. The following separately describes the two manners by using examples.

In an example, the third resource block group includes 12 RBs, which are divided into six resource block groups numbered from resource block groups 0 to 5. The resource block groups 3 and 4 are second resource block groups. Each RB includes a maximum of eight DMRS ports numbered from DMRS ports 1 to 8. A DMRS port 0 on one RB in the resource block group 3 and a DMRS port 3 on another RB in the resource block group 3 are DMRS ports associated with the interference signal. A DMRS port 2 on one RB in the resource block group 4 and a DMRS port 3 on another RB in the resource block group 4 are DMRS ports associated with the interference signal.

According to the former manner, the third indication information indicates that DMRS ports 0, 2, and 3 corresponding to the resource block groups 3 and 4 are third DMRS ports, or the third indication information may indicate that some of the DMRS ports 0, 2, and 3 corresponding to the resource block groups 3 and 4 are third DMRS ports.

According to the latter manner, the third indication information indicates that DMRS ports 0 and 3 corresponding to the resource block group 3 are third DMRS ports, and indicates that DMRS ports 2 and 3 corresponding to the resource block 4 are first DMRS ports, or the third indication information may indicate that some of the DMRS ports 0 and 3 corresponding to the resource block group 3 and some of the DMRS ports 2 and 3 corresponding to the resource block group 4 are third DMRS ports.

Optionally, the power or strength of an interference signal received by the terminal device is greater than the second preset value, or the correlation between the DMRS port associated with the interference signal and the first DMRS port is greater than the third preset value. In this embodiment, an interference signal that meets the foregoing condition is also referred to as a strong interference signal, and a DMRS port associated with the interference signal that meets the foregoing condition is referred to as a DMRS port with strong interference.

In an example, the third indication information may be carried in DCI. Further, the third indication information and the first indication information may be carried in the same DCI. In other words, the third indication information and the first indication information may be carried in the first DCI.

Therefore, when the terminal device performs DMRS port detection, the following solutions may be further included.

That the terminal device performs DMRS port detection on the at least one second resource block group based on the third indication information includes the following two possible cases:

Possible case 1: At least one DMRS port in the at least one third DMRS port and the at least one first DMRS port are detected.

For the second resource block group, the terminal device preferentially detects, based on the quantity of times of DMRS port detection that can be performed by the terminal device on the second resource block group, a third DMRS port indicated by the network device and a first DMRS port that carries a downlink signal to be sent by the network device to the terminal device.

Possible case 2: All DMRS ports in the at least one third DMRS port, the at least one first DMRS port, and at least one fourth DMRS port are detected.

For the second resource block group, based on the quantity of times of DMRS port detection that can be performed by the terminal device on the second resource block group, the terminal device may further detect the fourth DMRS port in addition to detecting the third DMRS port indicated by the network device and the first DMRS port that carries the downlink signal to be sent by the network device to the terminal device. The at least one fourth DMRS port is one or more of DMRS ports except the at least one third DMRS port in DMRS ports corresponding to the at least one second resource block group.

Further, the terminal device may process, based on a channel coefficient of the third DMRS port and a channel coefficient of a DMRS port associated with the downlink signal that is sent by the network device to the terminal device and is carried on the second resource block group, the downlink signal received by the terminal device on the second resource block group. For example, the processing is interference suppression, demodulation, decoding, or the like.

In the solution in this embodiment of this application, based on that the quantity of times of DMRS port detection by the terminal device on the second resource block group is less than the first preset value, the network device further indicates the third DMRS port for the second resource block group, and the terminal device preferentially detects the third DMRS port. For the resource block group receiving less interference, this reduces a case in which the terminal device performs channel estimation on a DMRS port without interference, and therefore, effectively reduces calculation overheads used for DMRS port detection or DMRS port channel estimation.

Figures 6, 7:
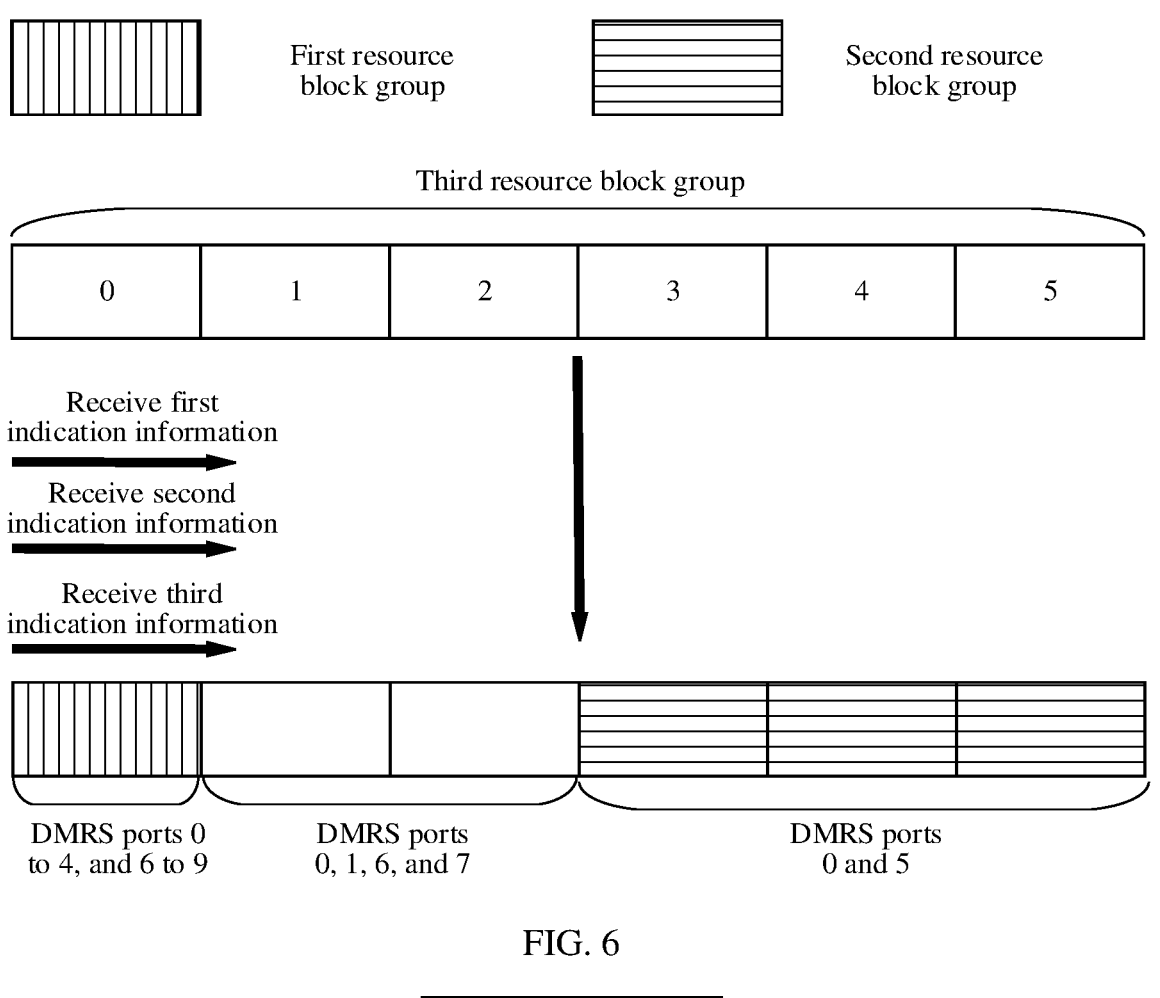
FIG. 6 is a schematic block diagram of another example in which a terminal device dynamically assigns a channel estimation resource according to this application.
FIG. 7 is a schematic block diagram of an example of a terminal device according to this application.

FIG. 6 is a schematic block diagram of another example in which a terminal device dynamically assigns a channel estimation resource according to this application.

As shown in FIG. 6, in an example, the terminal device receives a downlink signal on resource block groups 0 to 5, and a DMRS port associated with the downlink signal is a DMRS port 0. A network device configures 12 DMRS ports for the terminal device. The 12 DMRS ports are numbered from DMRS ports 0 to 11, and are divided into three CDM groups numbered from CDM groups 0 to 2. The CDM group 0 includes DMRS ports 0, 1, 6, and 7, the CDM group 1 includes DMRS ports 2, 3, 8, and 9, and the CDM group 2 includes DMRS ports 4, 5, 10, and 11. First indication information indicates that a first resource block group is the resource block group 0, and second resource block groups are the resource block groups 3, 4, and 5. If second indication information indicates CDM groups 0 and 1 on the first resource block group, the terminal device preferentially detects DMRS ports, namely, the DMRS ports 0 to 3 and the DMRS ports 6 to 9, included in the CDM groups 0 and 1. In addition, it is assumed that a quantity of times of detection determined by the terminal device on the first resource block group is greater than a quantity of times of DMRS port detection included in the CDM groups 0 and 1. In this case, the terminal device may detect another DMRS port, for example, a DMRS port 4, on the first resource block group, or may detect another port. In addition, the terminal device further needs to detect a DMRS port associated with a downlink signal of the terminal device. Because the CDM group 0 already includes the DMRS port 0, a channel coefficient of the DMRS port 0 may be determined. If third indication information indicates a DMRS port 5, the terminal device detects the DMRS port 5 on the second resource block group. In addition, the terminal device further needs to detect the DMRS port, that is, detect the DMRS port 0, associated with the downlink signal of the terminal device.

It should be understood that the network device may send only the first indication information, or the network device may send the first indication information and the second indication information, or the network device may send the first indication information and the third indication information, or the network device may send the first indication information, the second indication information, and the third indication information. Correspondingly, the terminal device performs corresponding processing based on the received indication information. In other words, the solution in this embodiment of this application includes the first indication information, the second indication information, and the third indication information that are merely used as examples. This is not limited in this application.

Optionally, the method 300 further includes:

In correspondence to Manner 3 in step S303, that the terminal device performs DMRS port detection may further include: The terminal device performs DMRS port detection on the fourth resource block group.

Specifically, a quantity of times of DMRS port detection by the terminal device on each of the at least one fourth resource block group is less than or equal to the quantity of times of DMRS port detection by the terminal device on each of the at least one first resource block group, and is greater than the quantity of times of DMRS port detection by the terminal device on each of the at least one second resource block group.

For example, as shown in FIG. 5, after the terminal device receives the first indication information, the terminal device determines that fourth resource block groups are resource block groups 1 and 2, and the terminal device may keep the quantity of times of DMRS port detection on the fourth resource block group unchanged, that is, keep a quantity of times of channel estimation on the fourth resource block group unchanged. As shown in FIG. 5, the terminal may detect DMRS ports 0, 1, 6, and 7 on the fourth resource block group (which is the resource block group 1 or 2). Alternatively, the terminal device may reduce or increase the quantity of times of DMRS port detection on the fourth resource block group, that is, reduce or increase the quantity of times of channel estimation on the fourth resource block group, provided that a reduced or increased quantity of times of DMRS port detection or a reduced or increased quantity of times of channel estimation meets the foregoing condition. Further, the terminal device may further determine a channel coefficient of a detected DMRS port in the fourth resource block group. In other words, the terminal device performs channel estimation on the detected DMRS port in the fourth resource block to obtain the channel coefficient. Further, the terminal device may process, based on the channel coefficient and a channel coefficient of a DMRS port associated with a downlink signal that is sent by the network device to the terminal device and is carried on the fourth resource block group, the downlink signal received by the terminal device on the fourth resource block group. For example, the processing is interference suppression, demodulation, or the like.

Optionally, the method 300 may further include the following several steps.

Step 1: The terminal device sends fourth indication information to the network device, where the fourth indication information indicates a maximum quantity of times of DMRS port detection by the terminal device on one or more resource blocks.

The fourth indication information indicates the maximum quantity of times of DMRS port detection by the terminal device on the one or more resource blocks.

It should be understood that, one resource block group includes one or more resource blocks. Therefore, step 1 may also be understood as that the terminal device sends a maximum quantity of times of DMRS port detection by the terminal device on one or more resource block groups to the network device.

Optionally, the terminal device determines a maximum quantity N of times of DMRS port detection. It should be understood that, the maximum quantity of times is limited by a resource, such as hardware or a chip, assigned by the terminal device for DMRS port detection, and may be a fixed value predetermined by the terminal device, or may be a dynamic value. The dynamic value dynamically changes with a change of the resource assigned by the terminal device for DMRS port detection.

The terminal device may report a capability of DMRS port detection by the terminal device to the network device in a plurality of manners. In other words, the terminal device may report a maximum quantity of times of DMRS port detection by the terminal device to the network device in a plurality of manners.

Manner 1: The terminal device sends a maximum quantity of times of DMRS port detection by the terminal device on a plurality of resource blocks or a plurality of resource block groups to the network device.

In an example, the terminal device sends fourth indication information to the network device, where the fourth indication information includes one or more fields, and the one or more fields indicate the maximum quantity of times of DMRS port detection by the terminal device. For example, the fourth indication information includes one field, and the field indicates the maximum quantity N of times of DMRS port detection by the terminal device. Alternatively, the fourth indication information includes three fields: a first field, a second field, and a third field. The three fields indicate the maximum quantity N of times of DMRS port detection by the terminal device. $N=N1 \cdot N2 \cdot N3$, where the first field indicates a quantity N1 of DMRS ports that can be detected by the terminal device on each resource block, the second field indicates a quantity N2 of resource blocks or resource block groups, and the third field indicates a quantity N3 of receive antennas of the terminal device.

Manner 2: The terminal device sends a maximum quantity of times of DMRS port detection by the terminal device on one resource block or one resource block group to the network device. In an example, the terminal device sends fourth indication information to the network device, where the fourth indication information includes one or more fields, and the one or more fields indicate the maximum quantity of times of DMRS port detection by the terminal device on each resource block or resource block group. For example, the fourth indication information includes one field, and the field may indicate a maximum quantity $N_{RB}$ of times of DMRS port detection by the terminal device on each resource block, where $N_{RB}=N/N4$, and N4 is a predetermined preset value used for indicating a quantity of resource blocks. Specifically, N4 may be a quantity of resource blocks or resource block groups included in an initial bandwidth or a bandwidth part (BWP).

It should be understood that because the network device may predetermine N4, the terminal device may indicate the maximum quantity of times of DMRS port detection by the terminal device by using the second indication information in Manner 2. In other words, the network device may determine the maximum quantity of times of DMRS port detection by the terminal device by using $N=N_{RB} \cdot N4$.

It should be understood that, in addition to the foregoing Manner 1 and Manner 2, the terminal device may alternatively report the capability of DMRS port detection by the terminal device to the network device in another manner.

Step 2: The network device determines the first preset value based on the fourth indication information.

Possible case 1: In the third resource block group, when the network device determines that a quantity of DMRS ports with strong interference on one or more resource block groups is greater than an average quantity of DMRS ports that can be detected by the terminal device on each of the third resource block group, the network device determines the average quantity of DMRS ports that can be detected by the terminal device on each of the third resource block group as the first preset value. Subsequently, the network device may not send the first preset value to the terminal device, or may send the first preset value to the terminal device.

Possible case 2: When the network device determines that quantities of DMRS ports with strong interference on all resource block groups in the third resource block group are less than or equal to the average quantity of DMRS ports that can be detected by the terminal device on each of the third resource block group, the network device re-determines a threshold, and determines the threshold as the first preset value. The threshold is less than the average quantity of DMRS ports that can be detected by the terminal device on each of the third resource block group, and is greater than a quantity of DMRS ports associated with a downlink signal to be sent by the network device to the terminal device.

Before determining the first preset value, the network device needs to determine, based on reported information about the capability of DMRS port detection by the terminal device, an average quantity of times of DMRS port detection that can be performed by the terminal device on each resource block group, in other words, determine an average quantity of times of DMRS port detection that can be performed by the terminal device on each resource block group when the terminal device performs DMRS port detection.

In an example, the network device determines, based on the fourth indication information, an average quantity $N_{RBG}$ of times of DMRS port detection that can be performed by the terminal device on each resource block group when the terminal device performs DMRS port detection on the third resource block group. The network device may determine, based on the maximum quantity of times of DMRS port detection by the terminal device and a quantity N2' of resource block groups in the third resource block group, an average quantity $N_{RBG}$ of times of DMRS port detection that can be performed by the terminal device on each of the third resource block group. To be specific, $N_{RBG}=N/N2'$.

It should be noted that, the third resource block group is a resource block group that carries the downlink signal to be sent by the network device to the terminal device.

In step 2, when determining the first preset value, the network device may first determine, based on $N_{RBG}$, an average quantity $$N_{PRG}^{DMRS}$$

of DMRS ports that can be detected by the terminal device on each of the third resource block group.

In an example, the network device may determine, based on a predetermined quantity N3' of receive antennas and $N_{RBG}$, an average quantity $$N_{PRG}^{DMRS}$$

of DMRS ports that can be detected by the terminal device on each resource block group when the terminal device performs DMRS port detection on the third resource block group. To be specific, $$N_{PRG}^{DMRS} = N_{RBG}/N3'.$$

In step 2, after determining $$N_{PRG}^{DMRS},$$

the network device may determine the first preset value based on a value relationship between the quantity of DMRS ports with strong interference on each of the third resource block group and $$N_{PRG}^{DMRS}.$$

In an example, when determining that a quantity of DMRS ports with strong interference on one or more resource block groups of the third resource block group is greater than $$N_{PRG}^{DMRS},$$

the network device may determine $N_{RBG}$ as the first preset value.

In an example, when determining that quantities of DMRS ports with strong interference on all resource block groups in the third resource block group are less than or equal to $$N_{PRG}^{DMRS},$$

in other words, when determining that a quantity of DMRS ports with strong interference on any resource block group is less than or equal to $$N_{PRG}^{DMRS},$$

the network device determines a first threshold as the first preset value. The first threshold is less than $N_{RBG}$, and is greater than a quantity of times that the terminal device needs to detect all first DMRS ports on a resource block group, where the first DMRS port is the DMRS port associated with the downlink signal to be sent by the network device to the terminal device.

It should be understood that, the network device may predetermine the quantity of receive antennas of the terminal device.

It should be noted that, the DMRS port with strong interference is a DMRS port associated with a strong interference signal, and the strong interference signal is an interference signal that is received by the terminal device and whose power or strength is greater than a second preset value. Alternatively, a correlation between the DMRS port with strong interference and the first DMRS port is greater than a third preset value, and the first DMRS port is the DMRS port associated with the downlink signal to be sent by the network device to the terminal device. The second preset value herein may be determined based on a transmit power of the network device, or may be a value predetermined by the network device. The third preset value herein may be a value predetermined for the network device. Alternatively, the second preset value and the third preset value may be determined in another manner. This is not limited in this application.

Step 3: The terminal device determines the first preset value, where the first preset value may be predefined, or may be indicated by the network device.

In correspondence to the possible case 1 in step 2, when the terminal device does not receive indication information that is sent by the network device and that indicates the first preset value, the first preset value may be determined by the terminal device based on a preconfigured maximum quantity of times of DMRS port detection by the terminal device on the one or more resource blocks and a quantity of resource block groups included in the third resource block group. That is, the first preset value may be predefined. When the terminal device receives a first preset value indicated by the network device, the terminal device determines the first preset value based on an indication of the network device.

In correspondence to the possible case 2 in step 2, the terminal device determines the first preset value based on an indication of the network device.

It should be understood that before DMRS port detection, the foregoing step 1 to step 3 may not be performed.

In an example, after being connected to the network device, after determining the first preset value in step 1 to step 3, and when receiving and processing a signal in one or more slots, the terminal device may detect, based on the first preset value, a DMRS port on the third resource block group that carries the downlink signal, and does not need to determine the first preset value each time before DMRS port detection.

The foregoing describes in detail the methods provided in embodiments of this application with reference to FIG. 3 to FIG. 6. The following describes in detail communication apparatuses provided in embodiments of this application with reference to FIG. 7 to FIG. 10.

FIG. 7 is a schematic block diagram of a communication apparatus 10 configured to process a downlink signal according to an embodiment of this application. As shown in the figure, the communication apparatus 10 may include a transceiver module 11 and a processing module 12.

In a possible implementation, the communication apparatus 10 may correspond to the terminal device in the foregoing method embodiments. For example, the communication apparatus 10 may be user equipment or a chip configured in user equipment.

Specifically, the communication apparatus 10 may correspond to the terminal device in the method 300 according to embodiments of this application. The communication apparatus 10 may include modules configured to perform the method performed by the terminal device in the method 300 in FIG. 3. In addition, units in the communication apparatus 10 and the foregoing other operations and/or functions are respectively used for implementing corresponding procedures of the method 300 in FIG. 3.

When the communication apparatus 10 is configured to perform the method 300 in FIG. 3, the transceiver module 11 may be configured to perform step S302 in the method 300, and the processing module 12 may be configured to perform steps S303 and S304 in the method 300.

Specifically, the transceiver module 11 is configured to receive first indication information from a network device. The processing module 12 is configured to determine at least one first resource block group and at least one second resource block group based on the first indication information, where the first indication information indicates the at least one first resource block group and/or the at least one second resource block group. The processing module 12 is further configured to perform DMRS port detection, where a quantity of times of DMRS port detection on each of the at least one first resource block group is greater than or equal to a first preset value, and a quantity of times of DMRS port detection on each of the at least one second resource block group is less than the first preset value.

The transceiver module 11 is further configured to receive second indication information from the network device, where the second indication information indicates at least one first CDM group, the at least one first CDM group corresponds to the at least one first resource block group, and the at least one first CDM group includes a DMRS port associated with an interference signal. The processing module 12 is further specifically configured to: detect at least one DMRS port in the at least one first CDM group and at least one first DMRS port on the at least one first resource block group; detect all DMRS ports in the at least one first CDM group and at least one first DMRS port on the at least one first resource block group; or detect all DMRS ports in the at least one first CDM group, at least one first DMRS port, and at least one second DMRS port on the at least one first resource block group. The at least one first DMRS port is a DMRS port associated with a downlink signal to be sent by the network device to the terminal device, and the at least one second DMRS port is one or more of DMRS ports except all the DMRS ports in the first CDM group and all ports in the at least one first DMRS port in DMRS ports corresponding to the at least one first resource block group.

The transceiver module 11 is further configured to receive third indication information from the network device, where the third indication information indicates at least one third DMRS port, and the at least one third DMRS port is a DMRS port that corresponds to the at least one second resource block group and is associated with an interference signal. The processing module 12 is further specifically configured to: detect at least one DMRS port in the at least one third DMRS port and the at least one first DMRS port on the at least one second resource block group; or detect all DMRS ports in the at least one third DMRS port, the at least one first DMRS port, and at least one fourth DMRS port on the at least one second resource block group. The at least one first DMRS port is the DMRS port associated with the downlink signal to be sent by the network device to the terminal device, and the at least one fourth DMRS port is one or more of DMRS ports except the at least one third DMRS port in DMRS ports corresponding to the at least one second resource block group.

Optionally, power or strength of an interference signal received by the terminal device is greater than a second preset value, or a correlation between the DMRS port associated with the interference signal and the first DMRS port is greater than a third preset value.

The processing module 12 is further configured to: determine the first preset value, where the first preset value is predefined, or the first preset value is indicated by the network device.

The transceiver module 11 is further configured to: send fourth indication information to the network device, where the fourth indication information indicates a maximum quantity of times of DMRS port detection by the terminal device on one or more resource blocks.

The processing module 12 is further specifically configured to: indicate the at least one first resource block group by using the first indication information, and determine a resource block group other than the at least one first resource block group in a third resource block group as the at least one second resource block group; or indicate the at least one second resource block group by using the first indication information, and determine a resource block group other than the at least one second resource block group in a third resource block group as the at least one first resource block group. The third resource block group is a resource block group that carries the downlink signal to be sent by the network device to the terminal device.

The processing module 12 is further specifically configured to: determine a resource block group other than the at least one first resource block group and the at least one second resource block group in a third resource block group as at least one fourth resource block group. The processing module 12 is further specifically used in the following cases: A quantity of times of DMRS port detection on each of the at least one fourth resource block group is less than or equal to the quantity of times of DMRS port detection on each of the at least one first resource block group, and is greater than the quantity of times of DMRS port detection on each of the at least one second resource block group.

Figure 8:
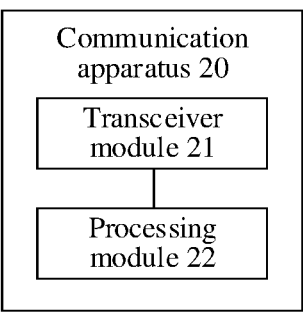
FIG. 8 is a schematic block diagram of an example of an access node according to this application.

FIG. 8 is a schematic block diagram of a communication apparatus 20 configured to process a downlink signal according to an embodiment of this application. As shown in the figure, the communication apparatus 20 may include a transceiver module 21 and a processing module 22.

In a possible implementation, the communication apparatus 20 may correspond to the network device in the foregoing method embodiments. For example, the communication apparatus 20 may be a RAN or a chip configured in a RAN.

Specifically, the communication apparatus 20 may correspond to the network device in the method 300 according to embodiments of this application. The communication apparatus 20 may include modules configured to perform the method performed by the network device in the method 300 in FIG. 3. In addition, units in the communication apparatus 20 and the foregoing other operations and/or functions are respectively used for implementing corresponding procedures of the method 300 in FIG. 3.

When the communication apparatus 20 is configured to perform the method 300 in FIG. 3, the transceiver module 21 may be configured to perform step S302 in the method 300, and the processing module 22 may be configured to perform step S301 in the method 300.

Specifically, the processing module 22 is configured to generate first indication information. The transceiver module 21 is configured to send the first indication information to a terminal device, where the first indication information indicates at least one first resource block group and/or at least one second resource block group, and the first indication information indicates that a quantity of times of DMRS port detection by the terminal device on each first resource block group is greater than or equal to a first preset value, and a quantity of times of DMRS port detection on each second resource block group is less than the first preset value.

The transceiver module 21 is further configured to: send second indication information to the terminal device, where the second indication information indicates at least one first CDM group, the at least one first CDM group corresponds to the at least one first resource block group, and the at least one first CDM group includes a DMRS port associated with an interference signal.

The transceiver module 21 is further configured to: send third indication information to the terminal device, where the third indication information indicates at least one third DMRS port, and the at least one third DMRS port is a DMRS port that corresponds to the at least one second resource block group and is associated with an interference signal.

The transceiver module 21 is further configured to receive fourth indication information from the terminal device, where the fourth indication information indicates a maximum quantity of times of DMRS port detection by the terminal device on one or more resource blocks. The processing module 22 is further configured to determine the first preset value based on the fourth indication information.

The transceiver module 21 is further configured to: send the first preset value to the terminal device.

Figure 9:
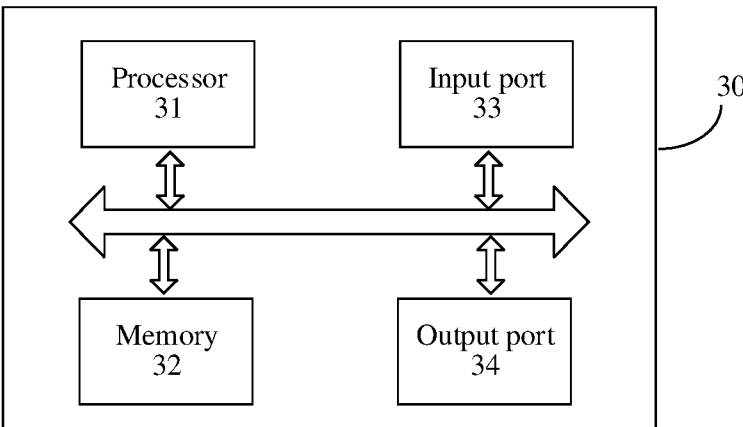
FIG. 9 is a schematic block diagram of an example of a communication apparatus according to this application.

FIG. 9 is a schematic diagram of a communication apparatus 30 configured to process a downlink signal according to an embodiment of this application. As shown in FIG. 9, the apparatus 30 may be a terminal device, including various handheld devices, in-vehicle devices, wearable devices, and computing devices that have a wireless communication function or including other processing devices connected to a wireless modem, may be various forms of terminals, mobile stations, terminals, user equipment, soft terminals, or the like, or may be a chip or a chip system located on a terminal device, or the like.

The apparatus 30 may include a processor 31 (which is an example of a processing module) and a memory 32. The memory 32 is configured to store instructions. The processor 31 is configured to execute the instructions stored in the memory 32, to enable the apparatus 30 to implement the steps performed by the terminal device in the method corresponding to FIG. 3.

Further, the apparatus 30 may further include an input port 33 (which is an example of a transceiver module) and an output port 34 (which is another example of the transceiver module). Further, the processor 31, the memory 32, the input port 33, and the output port 34 may communicate with each other through an internal connection path, to transmit a control signal and/or a data signal. The memory 32 is configured to store a computer program. The processor 31 may be configured to invoke the computer program from the memory 32 and run the computer program, to control the input port 33 to receive a signal, and control the output port 34 to send a signal, and therefore, complete the steps performed by the terminal device in the foregoing methods. The memory 32 may be integrated into the processor 31, or the memory 32 and the processor 31 may be disposed separately.

Optionally, if the communication apparatus 30 is a communication device, the input port 33 is a receiver, and the output port 34 is a transmitter. The receiver and the transmitter may be a same physical entity or different physical entities. When the receiver and the transmitter are the same physical entity, the receiver and the transmitter may be collectively referred to as a transceiver.

Optionally, if the communication apparatus 30 is a chip or a circuit, the input port 33 is an input interface, and the output port 34 is an output interface.

In an implementation, it may be considered that functions of the input port 33 and the output port 34 are implemented through a transceiver circuit or a dedicated transceiver chip. It may be considered that the processor 31 is implemented through a dedicated processing chip, a processing circuit, a processor, or a general-purpose chip.

In another implementation, it may be considered that the communication device provided in this embodiment of this application is implemented by using a general-purpose computer. To be specific, program code used for implementing functions of the processor 31, the input port 33, and the output port 34 is stored in the memory 32, and a general-purpose processor implements the functions of the processor 31, the input port 33, and the output port 34 by executing the code in the memory 32.

The modules or units in the communication apparatus 30 may be configured to perform actions or processing processes performed by a downlink signal processing device (for example, the terminal device) in the foregoing methods.

For concepts, explanations, detailed descriptions, and other steps of the apparatus 30 that are related to the technical solutions provided in embodiments of this application, refer to the descriptions of the content in the foregoing methods or other embodiments.

Figure 10:
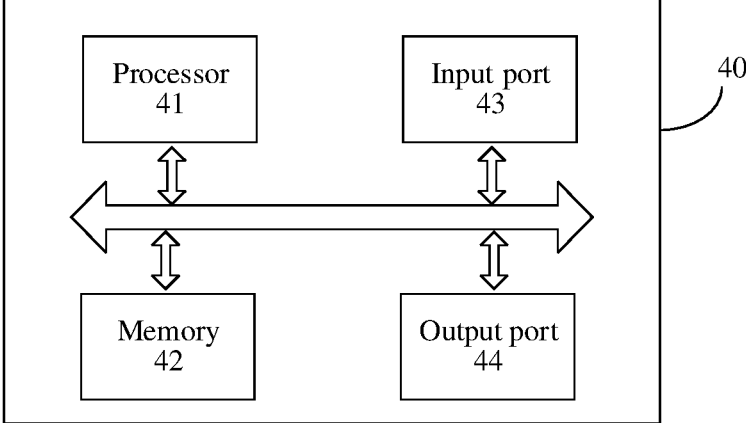
FIG. 10 is a schematic block diagram of another example of a communication apparatus according to this application.

FIG. 10 is a schematic diagram of a communication apparatus 40 configured to process a downlink signal according to an embodiment of this application. As shown in FIG. 10, the communication apparatus 40 may be a network device, including a network element, for example, a RAN, that provides an access function for a terminal device.

The communication apparatus 40 may include a processor 41 (which is an example of a processing module) and a memory 42. The memory 42 is configured to store instructions. The processor 41 is configured to execute the instructions stored in the memory 42, to enable the apparatus 40 to implement the steps performed by the network device in the method corresponding to FIG. 3.

Further, the communication apparatus 40 may further include an input port 43 (which is an example of a transceiver module) and an output port 44 (which is another example of the transceiver module). Further, the processor 41, the memory 42, the input port 43, and the output port 44 may communicate with each other through an internal connection path, to transmit a control signal and/or a data signal. The memory 42 is configured to store a computer program. The processor 41 may be configured to invoke the computer program from the memory 42 and run the computer program, to control the input port 43 to receive a signal, and control the output port 44 to send a signal, and therefore, complete the steps performed by the network device in the foregoing methods. The memory 42 may be integrated into the processor 41, or the memory 42 and the processor 41 may be disposed separately.

Optionally, if the communication apparatus 40 is a communication device, the input port 43 is a receiver, and the output port 44 is a transmitter. The receiver and the transmitter may be a same physical entity or different physical entities. When the receiver and the transmitter are the same physical entity, the receiver and the transmitter may be collectively referred to as a transceiver.

Optionally, if the communication apparatus 40 is a chip or a circuit, the input port 43 is an input interface, and the output port 44 is an output interface.

In an implementation, it may be considered that functions of the input port 43 and the output port 44 are implemented through a transceiver circuit or a dedicated transceiver chip. It may be considered that the processor 41 is implemented through a dedicated processing chip, a processing circuit, a processor, or a general-purpose chip.

In another implementation, it may be considered that the communication device provided in this embodiment of this application is implemented by using a general-purpose computer. To be specific, program code used for implementing functions of the processor 41, the input port 43, and the output port 44 is stored in the memory 42, and a general-purpose processor implements the functions of the processor 41, the input port 43, and the output port 44 by executing the code in the memory 42.

The modules or units in the communication apparatus 40 may be configured to perform actions or processing processes performed by a downlink signal sending device (namely, the network device) in the foregoing methods.

For concepts, explanations, detailed descriptions, and other steps of the communication apparatus 40 that are related to the technical solutions provided in embodiments of this application, refer to the descriptions of the content in the foregoing methods or other embodiments.

It should be understood that, in embodiments of this application, the processor may be a central processing unit (CPU). The processor may alternatively be another general-purpose processor, a digital signal processor (DSP), an application-specific integrated circuit (ASIC), a field programmable gate array (FPGA), another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

An embodiment of this application further provides a computer-readable storage medium. The computer-readable storage medium stores computer instructions used for implementing the method performed by the terminal device or the method performed by the network device in the foregoing method embodiments.

For example, when a computer program is executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

All or some of the foregoing embodiments may be implemented using software, hardware, firmware, or any combination thereof. When software is used for implementing embodiments, the foregoing embodiments may be implemented completely or partially in a form of a computer program product. The computer program product includes one or more computer instructions or computer programs. When the computer instructions or the computer programs are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that at least three relationships may exist. For example, A and/or B may represent the following three cases: Only A exists, both A and B exist, and only B exists. In addition, the character "/" in this specification usually represents an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and implementation constraints of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments. In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments. In addition, functional units in embodiments of this application may be integrated into one processing unit, each of the units may exist alone physically, or two or more units are integrated into one unit. When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions used for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A downlink signal processing method, comprising:
receiving first indication information;
determining at least one first resource block group and at least one second resource block group based on the first indication information;
performing demodulation reference signal (DMRS) port detection on each of the at least one first resource block group and on each of the at least one second resource block group, wherein a quantity of times of the DMRS port detection is performed on each of the at least one first resource block group is greater than or equal to a first value, and a quantity of times of the DMRS port detection is performed on each of the at least one second resource block group is less than the first value;
sending fourth indication information to the network device, wherein the fourth indication information indicates a maximum quantity of times DMRS port detection is performed by the terminal device on one or more resource blocks; and
determining the first value, wherein the first value is predefined, or the first value is indicated by the network device.

2. The method according to claim 1, further comprising:
receiving second indication information indicating at least one first code division multiplexing (CDM) group, wherein
the at least one first CDM group corresponds to the at least one first resource block group,
the at least one first CDM group includes a DMRS port associated with an interference signal, and
performing the DMRS port detection comprises:
detecting at least one DMRS port in the at least one first CDM group and at least one first DMRS port in the at least one first resource block group;
detecting all DMRS ports in the at least one first CDM group and at least one first DMRS port in the at least one first resource block group; or
detecting all DMRS ports in the at least one first CDM group, at least one first DMRS port, and at least one second DMRS port in the at least one first resource block group, wherein
the at least one first DMRS port includes a DMRS port associated with a downlink signal to be sent by a network device to a terminal device, and
the at least one second DMRS port includes one or more of DMRS ports except all the DMRS ports in the first CDM group and all ports in the at least one first DMRS port included in DMRS ports corresponding to the at least one first resource block group.

3. The method according to claim 2, further comprising:
receiving third indication information from the network device, wherein
the third indication information indicates at least one third DMRS port,
the at least one third DMRS port corresponds to the at least one second resource block group and includes a DMRS port corresponding to an interference signal, and
performing the DMRS port detection comprises:
detecting at least one DMRS port in the at least one third DMRS port and the at least one first DMRS port in the at least one second resource block group; or
detecting all DMRS ports in the at least one third DMRS port, the at least one first DMRS port, and at least one fourth DMRS port in the at least one second resource block group, wherein
the at least one first DMRS port is associated with the downlink signal to be sent by the network device to the terminal device, and
the at least one fourth DMRS port is one or more of DMRS ports except the at least one third DMRS port in DMRS ports corresponding to the at least one second resource block group.

4. The method according to claim 2, wherein
a power or a strength of an interference signal received by the terminal device is greater than a second value, or
a correlation between the DMRS port associated with the interference signal and the first DMRS port is greater than a third value.

5. A downlink signal processing method, comprising:

generating first indication information indicating at least one first resource block group and at least one second resource block group;

receiving fourth indication information from a terminal device;

determining a first value based on the fourth indication information; and sending the first indication information to the terminal device, wherein the first indication information indicates a quantity of times demodulation reference signal (DMRS) port detection performed by the terminal device on each first resource block group is greater than or equal to the first value, and indicates a quantity of times DMRS port detection performed by the terminal device on each second resource block group is less than the first value, and the fourth indication information indicates a maximum quantity of times DMRS port detection is performed by the terminal device on one or more resource blocks.

6. The method according to claim 5, further comprising:

sending second indication information to the terminal device, wherein the second indication information indicates at least one first code division multiplexing (CDM) group, the at least one first CDM group corresponds to the at least one first resource block group, and the at least one first CDM group includes a DMRS port associated with an interference signal.

7. The method according to claim 5, further comprising:

sending third indication information to the terminal device, wherein the third indication information indicates at least one third DMRS port, and the at least one third DMRS port corresponds to the at least one second resource block group and corresponds to an interference signal.

8. A communication apparatus, comprising:

one or more processors, wherein the one or more processors are configured to:

receive first indication information from a network device;

determine at least one first resource block group and at least one second resource block group based on the first indication information;

perform demodulation reference signal (DMRS) port detection on each of the at least one first resource block group and on each of the at least one second resource block group, wherein a quantity of times the DMRS port detection is performed on each of the at least one first resource block group is greater than or equal to a first value, and a quantity of times the DMRS port detection is performed on each of the at least one second resource block group is less than the first value;

send fourth indication information to the network device, wherein the fourth indication information indicates a maximum quantity of times DMRS port detection is performed on one or more resource blocks; and determine the first value, wherein the first value is predefined, or the first value is indicated by the network device.

9. The apparatus according to claim 8, wherein the apparatus is further cause to:

receive second indication information indicating at least one first code division multiplexing (CDM) group, wherein the at least one first CDM group corresponds to the at least one first resource block group, the at least one first CDM group includes a DMRS port associated with an interference signal, and performing the DMRS port detection comprises:

detecting at least one DMRS port in the at least one first CDM group and at least one first DMRS port in the at least one first resource block group;

detecting all DMRS ports in the at least one first CDM group and at least one first DMRS port in the at least one first resource block group; or detecting all DMRS ports in the at least one first CDM group, at least one first DMRS port, and at least one second DMRS port in the at least one first resource block group, wherein the at least one first DMRS port includes a DMRS port associated with a downlink signal to be sent by the network device to a terminal device, and the at least one second DMRS port includes one or more of DMRS ports except all the DMRS ports in the first CDM group and all ports in the at least one first DMRS port included in DMRS ports corresponding to the at least one first resource block group.

10. The apparatus according to claim 9, wherein the apparatus is further caused to:

receive third indication information from the network device, wherein the third indication information indicates at least one third DMRS port, the at least one third DMRS port corresponds to the at least one second resource block group and is associated with an interference signal, and performing the DMRS port detection comprises:

detecting at least one DMRS port in the at least one third DMRS port and the at least one first DMRS port in the at least one second resource block group; or detecting all DMRS ports in the at least one third DMRS port, the at least one first DMRS port, and at least one fourth DMRS port in the at least one second resource block group, wherein the at least one first DMRS port is associated with the downlink signal to be sent by the network device to the terminal device, and the at least one fourth DMRS port is one or more of DMRS ports except the at least one third DMRS port in DMRS ports corresponding to the at least one second resource block group.

11. The apparatus according to claim 9, wherein a power or a strength of an interference signal received by the terminal device is greater than a second value, or a correlation between the DMRS port associated with the interference signal and the first DMRS port is greater than a third value.

12. A communication apparatus, comprising:

one or more processors, wherein the one or more processors are configured to:

generate first indication information indicating at least one first resource block group and at least one second resource block group;

receive fourth indication information from a terminal device;

determine a first value based on the fourth indication information; and send the first indication information to the terminal device, wherein the first indication information indicates a quantity of times demodulation reference signal (DMRS) port detection performed by the terminal device on each first resource block group is greater than or equal to the first value, and indicates a quantity of times DMRS port detection performed by the terminal device on each second resource block group is less than the first value, and the fourth indication information indicates a maximum quantity of times DMRS port detection is performed by the terminal device on one or more resource blocks.

13. The apparatus according to claim 12, wherein the apparatus is further caused to:

send second indication information to the terminal device, wherein the second indication information indicates at least one first code division multiplexing (CDM) group, the at least one first CDM group corresponds to the at least one first resource block group, and the at least one first CDM group includes a DMRS port associated with an interference signal.

14. The apparatus according to claim 12, wherein the apparatus is further caused to:

send third indication information to the terminal device, wherein the third indication information indicates at least one third DMRS port, and the at least one third DMRS port corresponds to the at least one second resource block group and is associated with an interference signal.

15. The method according to claim 1, wherein the at least one first resource block group and the at least one second resource block group are included in a third resource block group used for carrying a downlink signal.

16. The method according to claim 5, wherein the at least one first resource block group and the at least one second resource block group are included in a third resource block group used for carrying a downlink signal.

* * * * *